(12) United States Patent
Agam et al.

(10) Patent No.: US 8,510,990 B2
(45) Date of Patent: Aug. 20, 2013

(54) PRESENCE DETECTOR FOR A DOOR ASSEMBLY

(75) Inventors: Uri Agam, Montreal (CA); Pino Marcovecchio, Montreal (CA)

(73) Assignee: Sensotech Inc., Montreal Quebec (CA)

( * ) Notice: Subject to any disclaimer, the term of this patent is extended or adjusted under 35 U.S.C. 154(b) by 142 days.

(21) Appl. No.: 12/735,899

(22) PCT Filed: Feb. 26, 2009

(86) PCT No.: PCT/CA2009/000221
§ 371 (c)(1),
(2), (4) Date: Aug. 23, 2010

(87) PCT Pub. No.: WO2009/105876
PCT Pub. Date: Sep. 3, 2009

(65) Prior Publication Data
US 2010/0319256 A1    Dec. 23, 2010

Related U.S. Application Data

(60) Provisional application No. 61/031,729, filed on Feb. 27, 2008, provisional application No. 61/096,912, filed on Sep. 15, 2008.

(51) Int. Cl.
*E05F 15/20* (2006.01)
*G01S 15/88* (2006.01)

(52) U.S. Cl.
USPC ................................ 49/28; 49/26

(58) Field of Classification Search
USPC ................... 49/26–28, 116, 118, 366
See application file for complete search history.

(56) References Cited

U.S. PATENT DOCUMENTS

| | | | | |
|---|---|---|---|---|
| 3,534,499 | A * | 10/1970 | Chaffee | 49/25 |
| 3,852,592 | A * | 12/1974 | Scoville et al. | 250/221 |
| 4,029,176 | A * | 6/1977 | Mills | 187/317 |
| RE30,719 | E * | 8/1981 | Mills | 187/317 |
| 4,551,826 | A * | 11/1985 | Kritz | 367/150 |
| 4,560,912 | A * | 12/1985 | Jonsson | 318/480 |
| 4,565,029 | A * | 1/1986 | Kornbrekke et al. | 49/25 |
| 4,577,437 | A * | 3/1986 | Gionet et al. | 49/25 |
| 4,590,410 | A * | 5/1986 | Jonsson | 318/480 |
| 4,591,864 | A * | 5/1986 | Sternberg et al. | 343/754 |
| 4,697,383 | A * | 10/1987 | Hagiwara | 49/25 |
| 4,698,937 | A * | 10/1987 | Kornbrekke et al. | 49/25 |
| 4,733,081 | A * | 3/1988 | Mizukami | 250/341.8 |

(Continued)

FOREIGN PATENT DOCUMENTS

| | | |
|---|---|---|
| EP | 1 120 526 A2 | 8/2001 |
| EP | 1 143 092 B1 | 10/2001 |
| EP | 1 253 276 A2 | 10/2002 |

*Primary Examiner* — Katherine Mitchell
*Assistant Examiner* — Justin Rephann
(74) *Attorney, Agent, or Firm* — Harrington & Smith

(57) ABSTRACT

A presence detector for a door assembly which includes a door closing a door entrance is described herein. The detector includes a transducer assembly mounted to the door assembly for emitting at least one ultrasound detecting beam adjacent the door entrance and for triggering a detecting signal indicative of a body located adjacent the door entrance when the body intersects the at least one ultrasound detecting beam and a controller for receiving information indicative of a position of the door and for controlling the emission of the at least one detecting beam accordingly with the position of the door. The detector assembly operates in crossing, ranging or dual modes.

31 Claims, 24 Drawing Sheets

(56) References Cited

U.S. PATENT DOCUMENTS

| | | | | |
|---|---|---|---|---|
| 4,779,240 A | * | 10/1988 | Dorr | 367/96 |
| 4,823,010 A | * | 4/1989 | Kornbrekke et al. | 250/341.7 |
| 4,851,746 A | * | 7/1989 | Milke | 318/467 |
| 4,866,881 A | * | 9/1989 | Morrow et al. | 49/25 |
| 4,893,852 A | * | 1/1990 | Harris et al. | 292/251.5 |
| 4,894,952 A | * | 1/1990 | Trett et al. | 49/25 |
| 4,910,464 A | * | 3/1990 | Trett et al. | 327/517 |
| 4,914,859 A | * | 4/1990 | Gionet et al. | 49/25 |
| 4,967,083 A | * | 10/1990 | Kornbrekke et al. | 250/341.7 |
| RE33,668 E | * | 8/1991 | Gray | 250/221 |
| 5,142,152 A | * | 8/1992 | Boiucaner | 250/341.7 |
| 5,149,921 A | * | 9/1992 | Picado | 187/317 |
| 5,276,391 A | * | 1/1994 | Jonsson | 318/480 |
| 5,369,912 A | * | 12/1994 | Ginzel et al. | 49/141 |
| 5,410,149 A | * | 4/1995 | Winston et al. | 250/221 |
| 5,420,430 A | * | 5/1995 | Trett | 250/341.1 |
| 5,428,278 A | * | 6/1995 | Bollengier et al. | 318/446 |
| 5,438,199 A | * | 8/1995 | Agam et al. | 250/334 |
| 5,770,935 A | * | 6/1998 | Smith et al. | 318/480 |
| 5,886,307 A | * | 3/1999 | Full et al. | 187/317 |
| 5,925,858 A | * | 7/1999 | Full et al. | 187/317 |
| 5,963,000 A | * | 10/1999 | Tsutsumi et al. | 318/480 |
| 5,996,281 A | * | 12/1999 | Takano et al. | 49/26 |
| 6,051,829 A | * | 4/2000 | Full | 250/221 |
| 6,167,991 B1 | * | 1/2001 | Full et al. | 187/317 |
| 6,304,178 B1 | | 10/2001 | Hayashida | 340/545.1 |
| 6,329,774 B1 | | 12/2001 | Ariav | 318/282 |
| 6,341,563 B1 | | 1/2002 | Gal et al. | 104/28 |
| 6,344,642 B1 | | 2/2002 | Agam et al. | 250/221 |
| 6,386,326 B2 | * | 5/2002 | Pustelniak et al. | 187/317 |
| 6,678,999 B2 | * | 1/2004 | Zengguang et al. | 49/25 |
| 6,782,660 B2 | * | 8/2004 | Takada et al. | 49/25 |
| 6,914,401 B2 | * | 7/2005 | Semelka | 318/480 |
| 6,970,085 B2 | * | 11/2005 | Okabe et al. | 340/545.6 |
| 7,130,244 B2 | | 10/2006 | Gal et al. | 367/98 |
| 7,176,647 B2 | * | 2/2007 | Parsadayan et al. | 318/445 |
| 7,221,118 B2 | * | 5/2007 | Sasaki et al. | 318/282 |
| 7,324,894 B2 | * | 1/2008 | Urman et al. | 701/124 |
| 7,378,641 B2 | * | 5/2008 | Melcher et al. | 250/221 |
| RE41,674 E | * | 9/2010 | Sasaki et al. | 318/282 |
| 8,051,954 B2 | * | 11/2011 | Pustelniak | 187/317 |
| 2002/0036259 A1 | * | 3/2002 | Agam et al. | 250/221 |
| 2003/0093951 A1 | * | 5/2003 | Ikeuchi | 49/31 |
| 2004/0136270 A1 | * | 7/2004 | Gal et al. | 367/98 |
| 2005/0140319 A1 | * | 6/2005 | Takashima | 318/286 |
| 2006/0086050 A1 | * | 4/2006 | Matsuyama et al. | 49/366 |
| 2006/0162254 A1 | * | 7/2006 | Imai et al. | 49/26 |
| 2006/0203615 A1 | * | 9/2006 | Gal et al. | 367/98 |
| 2007/0272019 A1 | * | 11/2007 | Agam et al. | 73/628 |

* cited by examiner

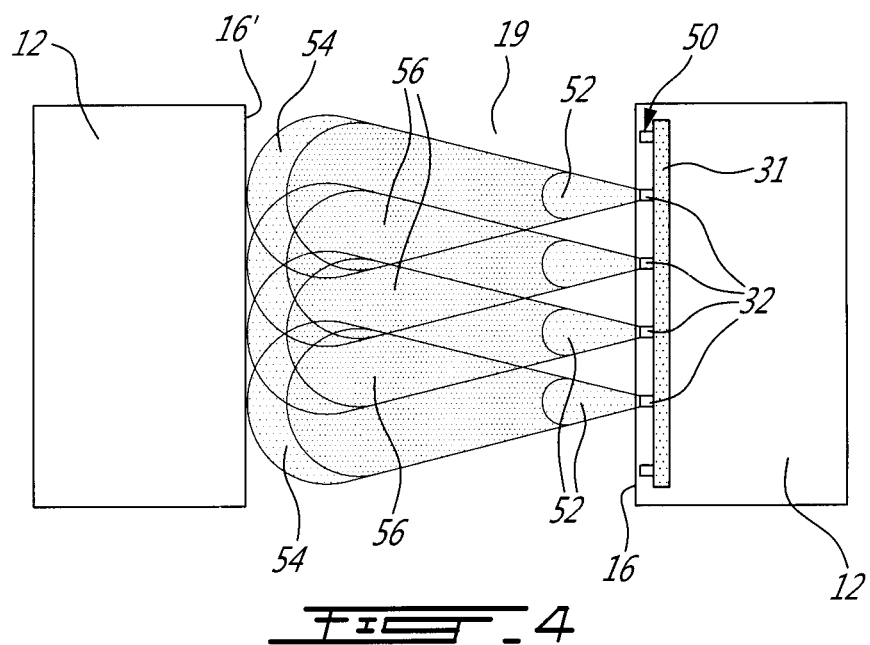
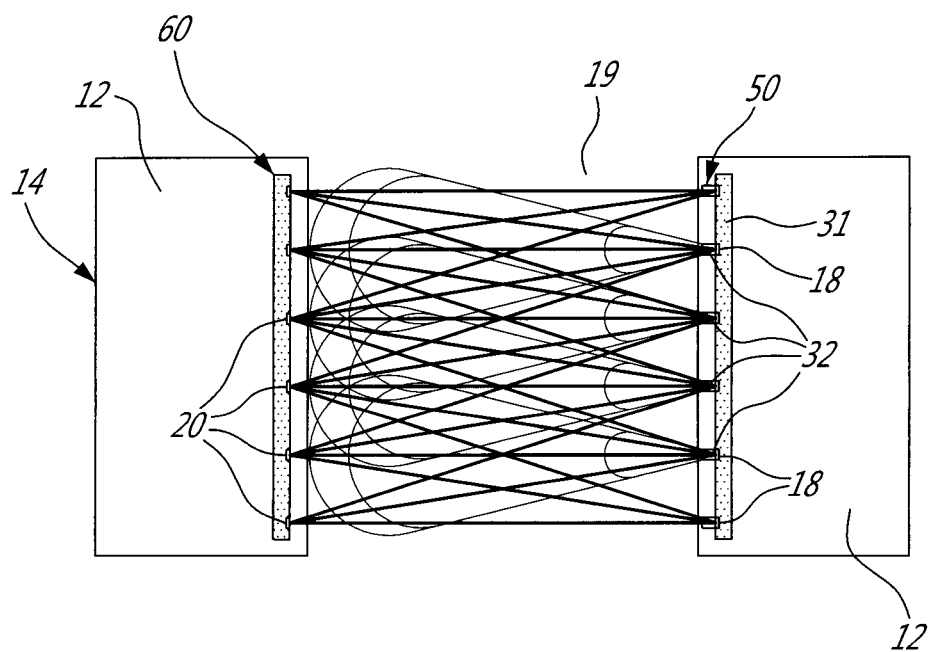

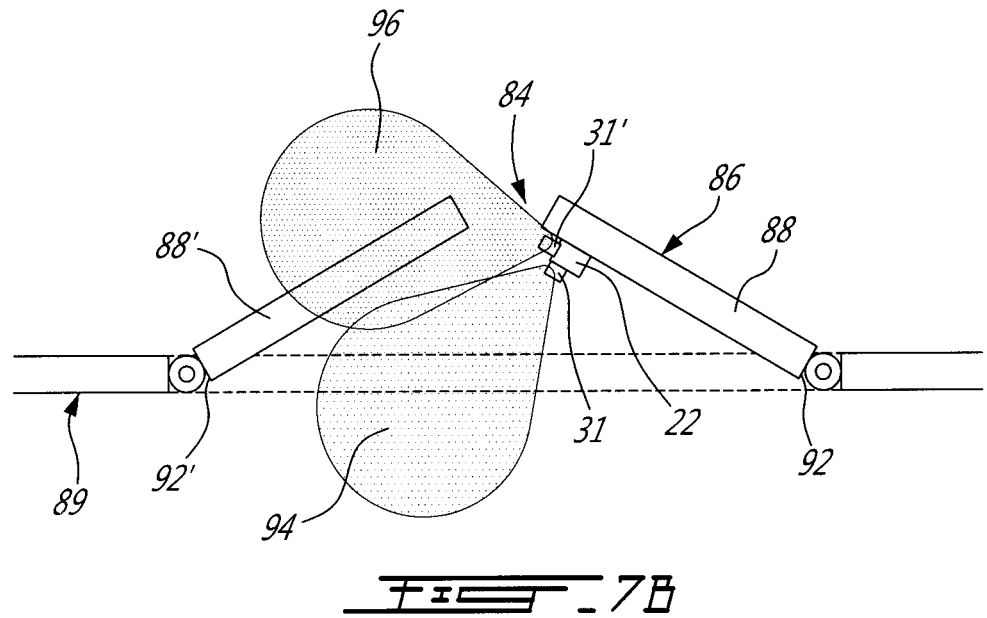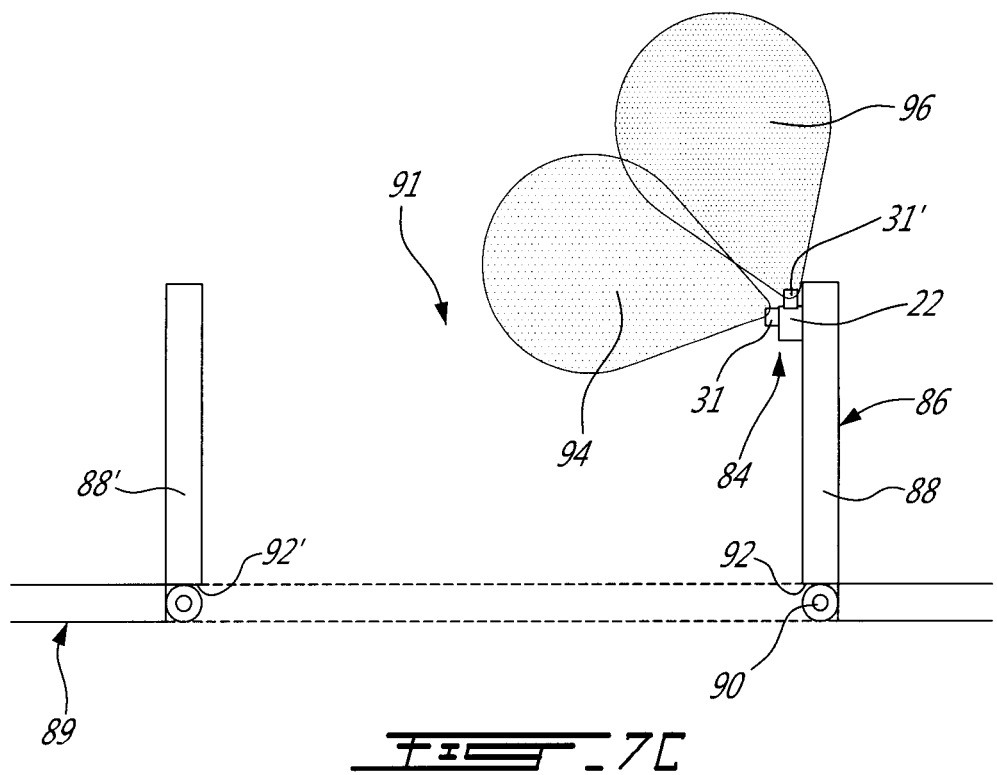

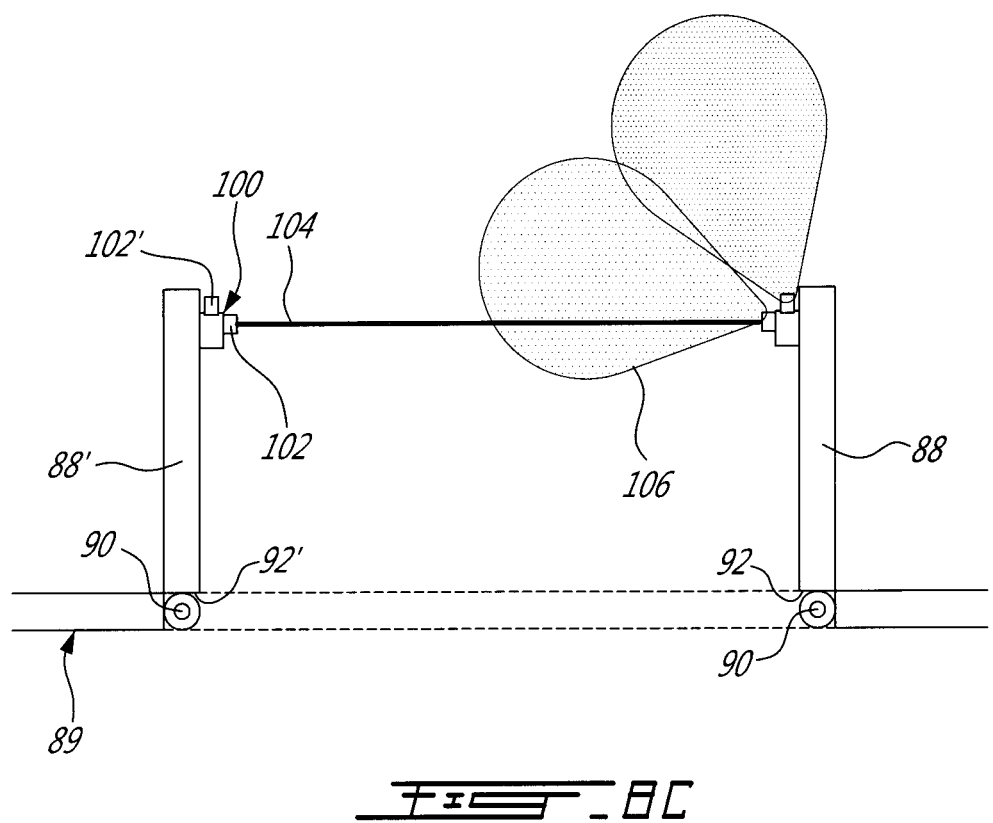

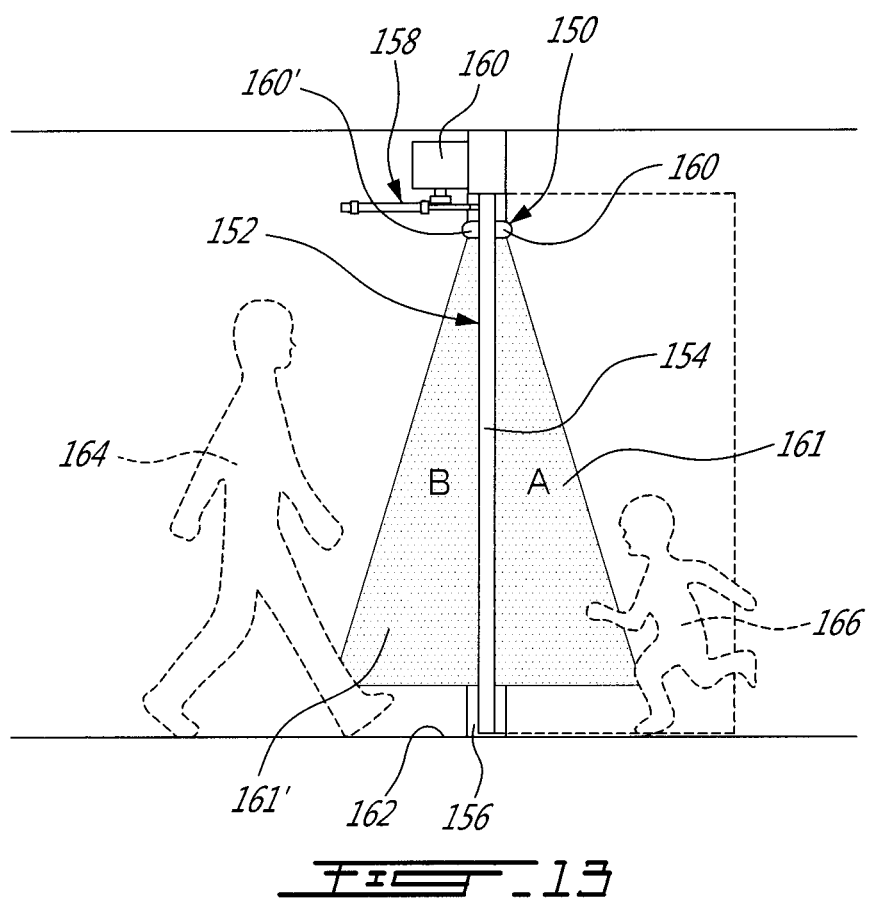

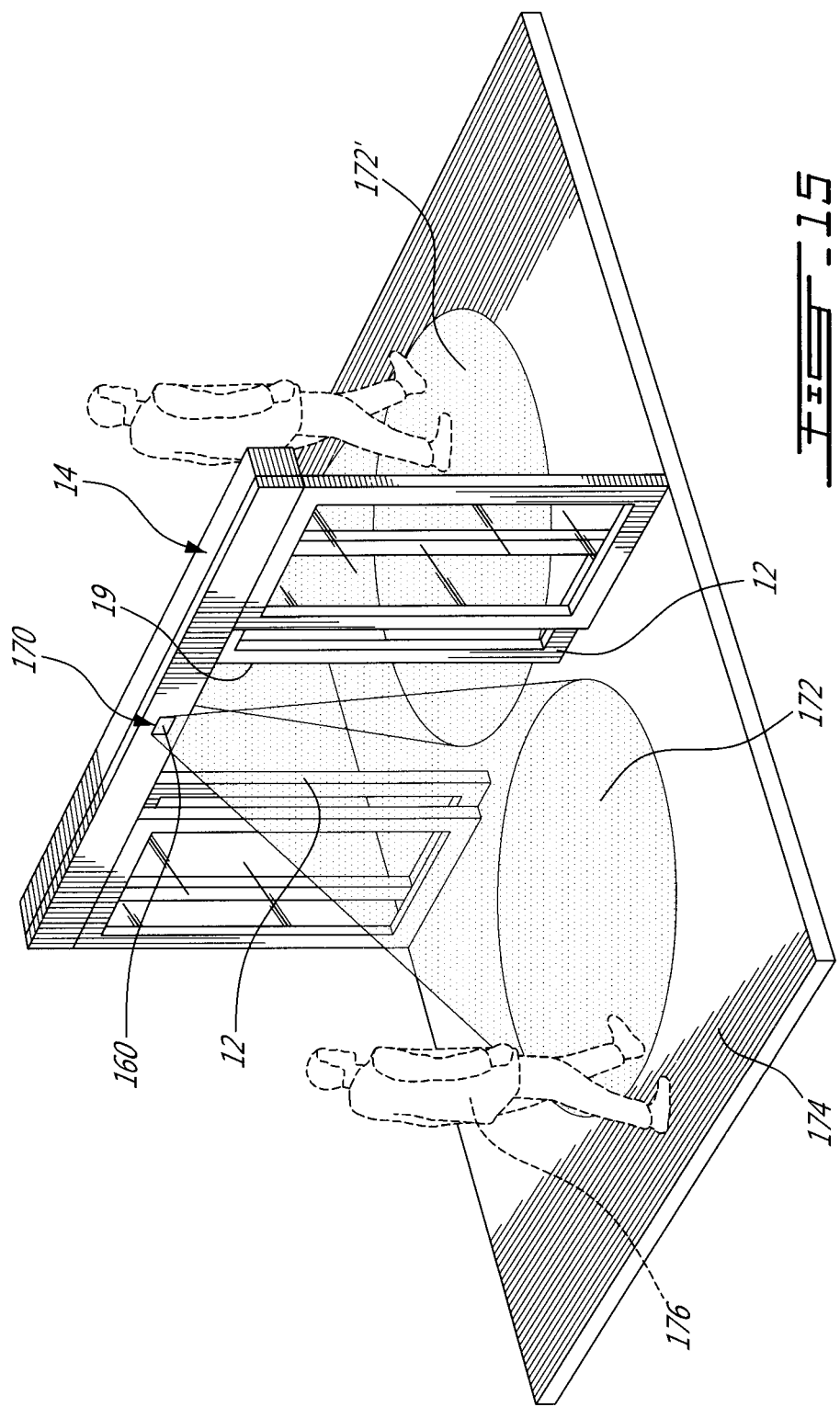

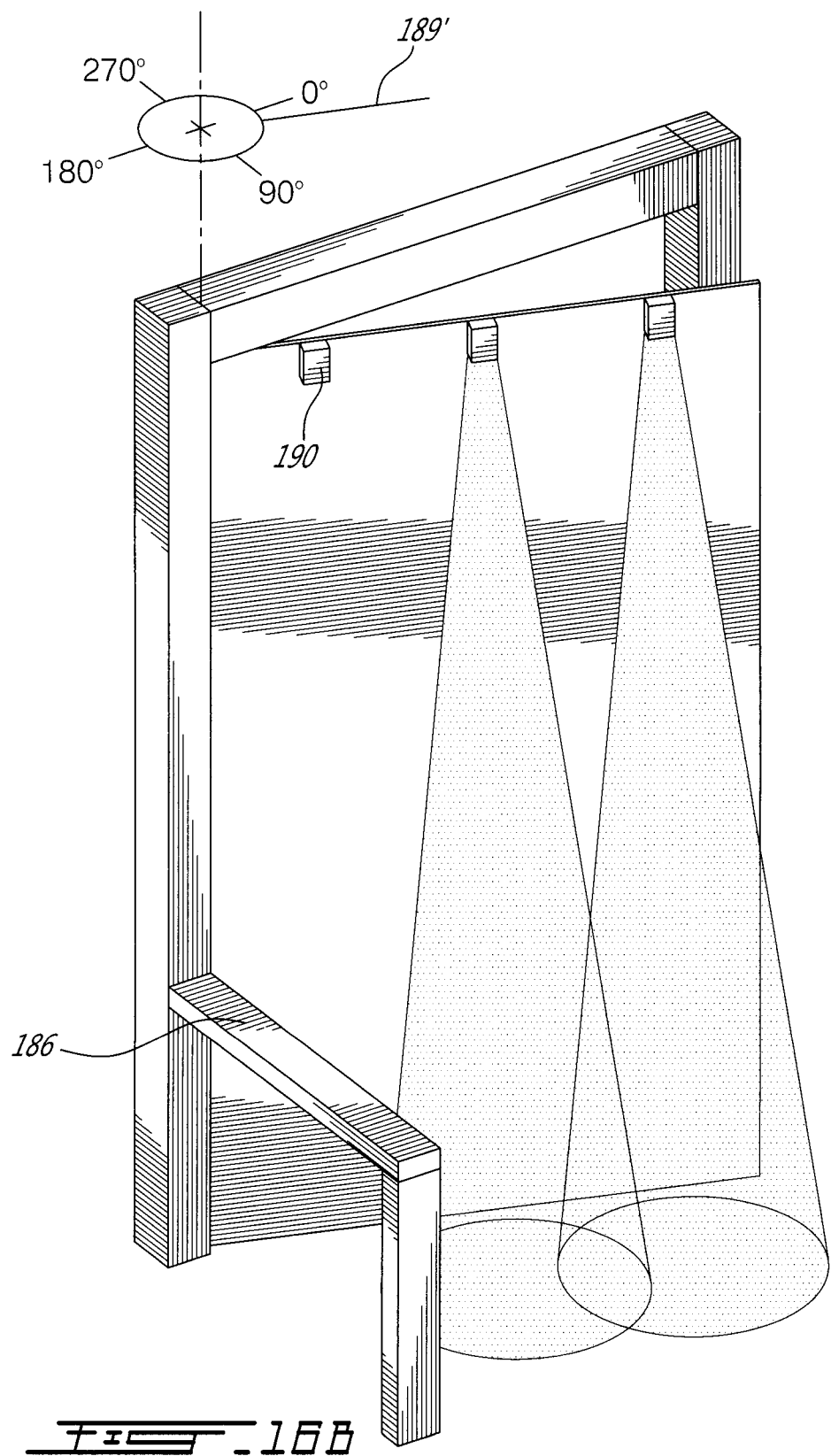

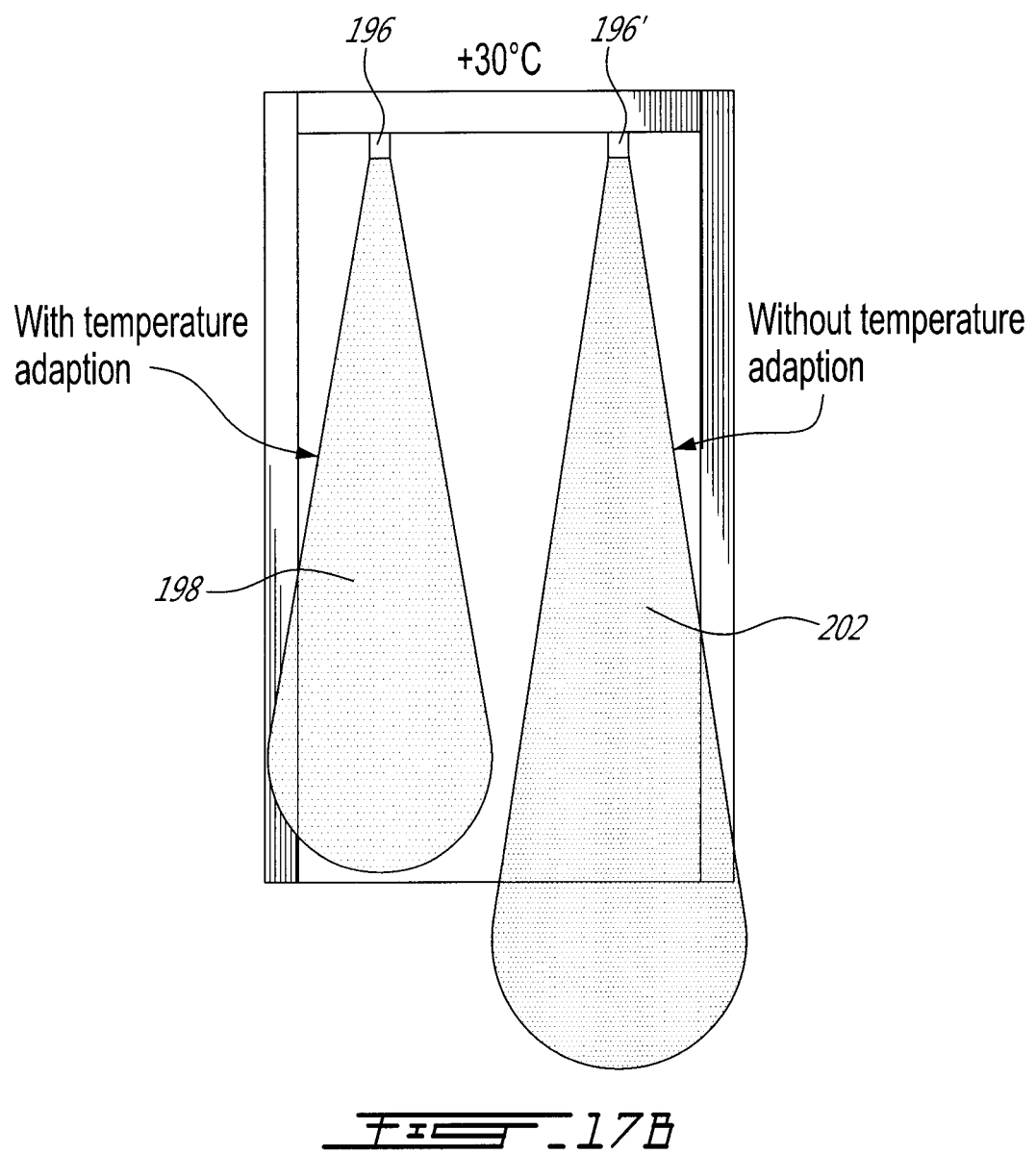

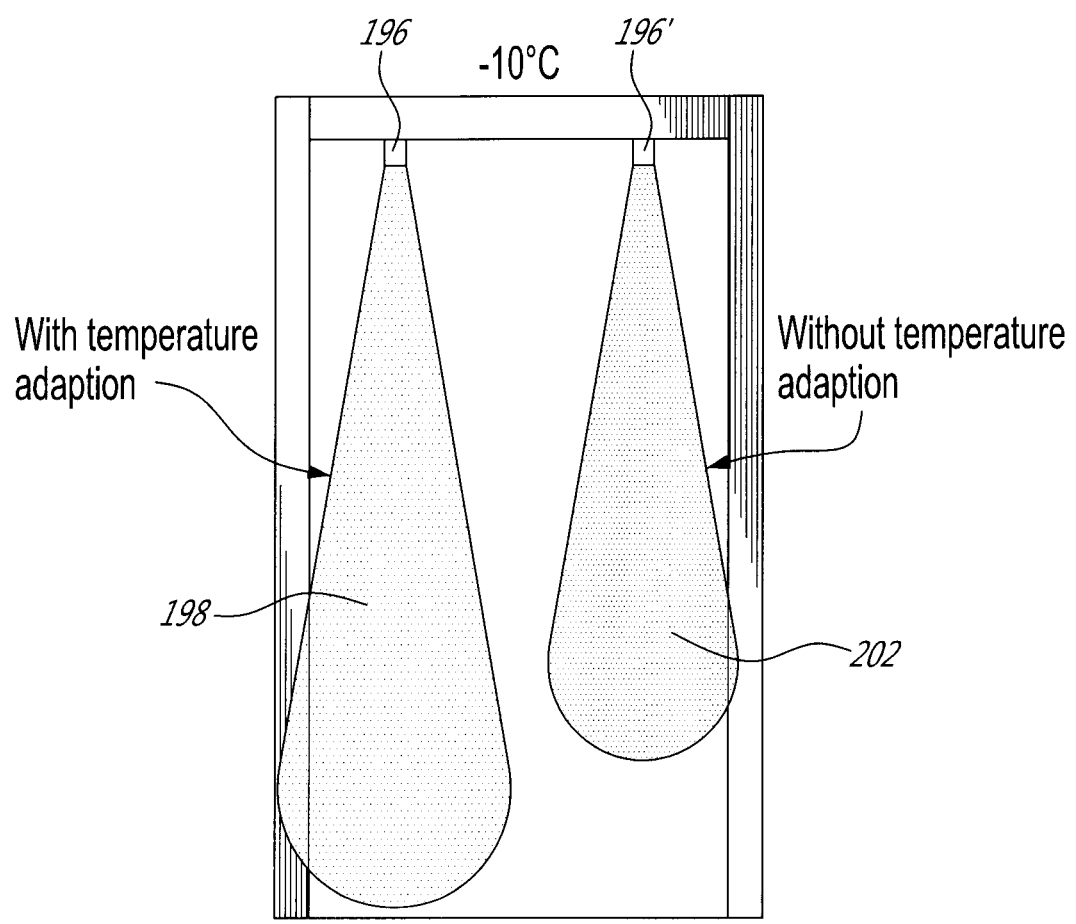

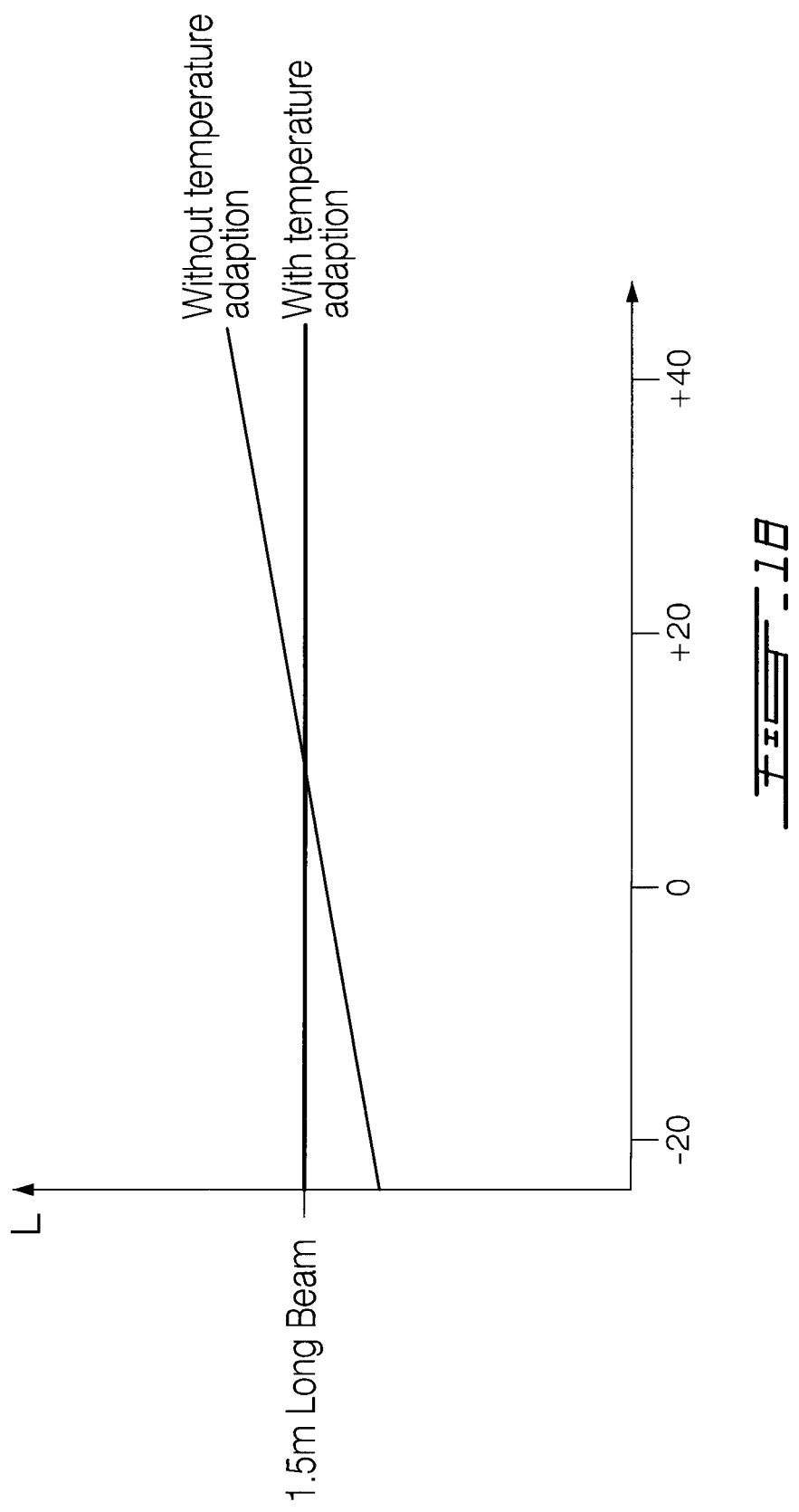

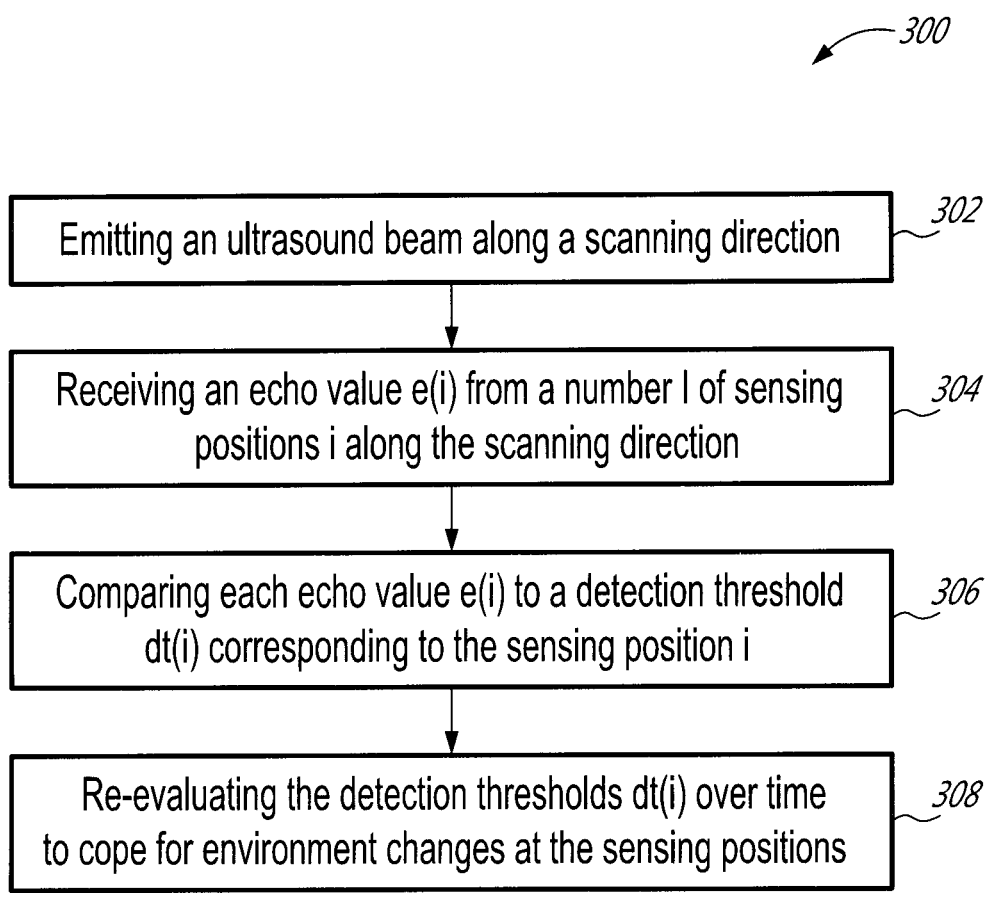

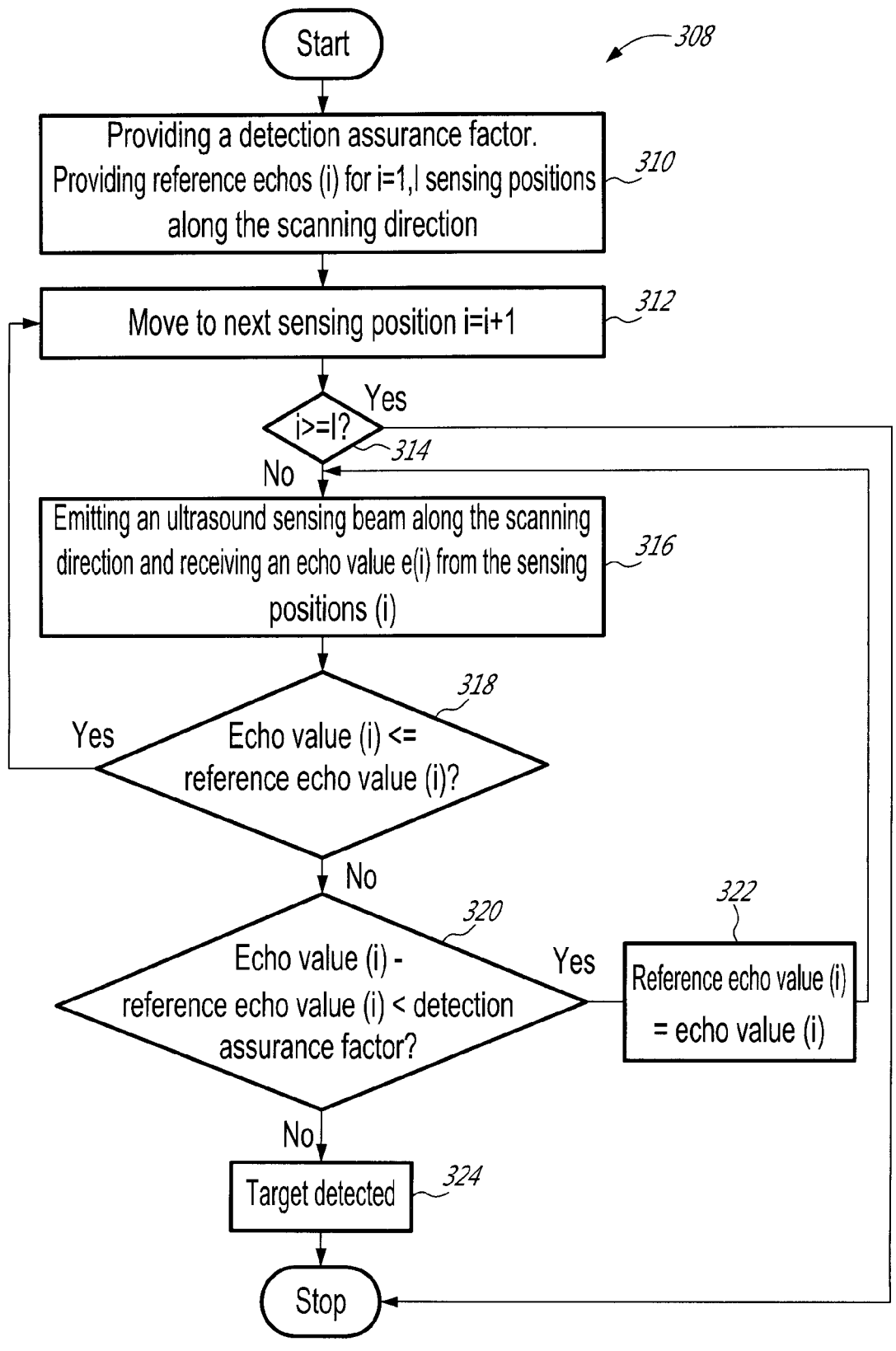

1

PRESENCE DETECTOR FOR A DOOR ASSEMBLY

This is a national stage application under 35 U.S.C. 371, of International Application Number PCT/CA2009/000221, filed on Feb. 26, 2009, which claims priority from U.S. provisional application Nos. 61/031,729 filed on Feb. 27, 2008, and 61/096,912 filed on Sep. 15, 2008.

BACKGROUND

Systems and methods are known in the art to detect the presence of a person or object at the entrance of an automatic door. These systems usually include infrared (IR) and/or microwave detector above the door which registers the increase of frequency of the emitted beam returning to the detector as a person moves towards the entrance, and more generally sense the motion coming from the objects to be detected.

It is also known in the art to use such systems on both sides of a pivoting door for example so as to prevent the door from colliding a person arriving on one side thereof while the door is caused to open by another person on the other side.

Radar technologies have also been proposed as an alternative to microwave technologies in such systems.

However, systems and methods known in the art suffer from the following drawbacks:
- radar and passive IR technologies can only be used in application where the target to detect are moving;
- especially in the case of IR-based systems, the environment has to be controlled, such systems being sensitive to rain, dust and light conditions;
- IR sensors are also sensitive to the surroundings, thereby being prone to false alarms. They cannot operate when the door enters the line of sight of the detector, and cannot be active when the door is moving; and
- IR sensors are not very accurate and therefore have to detect relatively long distance from the floor.

A typical solution in the art to this last specific problem, which is more common in elevator door applications, is to provide IR crossing beams in the door entrance. This however has the above-mentioned limitation of IR sensors, such as sensitivity to dirt, and also, since the resulted beams are very thin, they do not cover the whole opening.

BRIEF DESCRIPTION OF THE DRAWINGS

In the appended drawings: we describe an acoustic virtual wall with 'ranging' option. In this configuration each transducer can have emit acoustic burst and detect both returning signal from the target or burst from the emitting transducer in front of it. The length of the ranging cones can be controlled and can be change while the door is moving.

FIG. 4 is a schematic front elevation view of a presence detector for sliding doors according to a fourth embodiment, illustrating the dual mode of operation;

FIG. 5 is a front schematic elevation view of a presence detector for sliding doors according to a fifth embodiment, illustrating the dual-mode of operation;

FIGS. 7A-7C are schematic top plan views of a presence detector for a pair of pivoting doors according to a seventh illustrative embodiment, illustrating the ranging mode of operation and the change of coverage of the detecting area as the doors open;

FIGS. 8A-8C are schematic top plan views of a presence detector for a pair of pivoting doors according to an eighth illustrative embodiment, further illustrating the dual mode of operation and the adaptation of the detector configuration depending on the position of the doors;

FIG. 9A showing the doors fully opened and FIG. 9B showing the doors partially closed;

FIG. 13 is a schematic cross section of a power door including a presence detector according to a thirtieth embodiment, illustrating the use of acoustic cones printed on both sides of the door where the cone is limited to a distance just above the floor;

FIG. 15 is a schematic perspective view of a presence detector according to a fortieth embodiment, for use in the activation of sliding doors;

FIGS. 16A-16D are schematic perspective views of a presence detection for a power door assembly according to a fiftieth embodiment; illustrating the change of the detecting zone as the door position changes and schematically showing the angle between the door panel and door frame as read by an encoder;

FIGS. 17A-17C are schematic front elevation views of a power door assembly, illustrating the effect of temperature on the length of the detecting beams;

FIG. 18 is a graph showing the variation of a beam length as the temperature changes when no temperature and or sound speed change compensation is applied;

FIG. 19 is a flowchart of an adaptive ultrasound detecting method according to a further aspect of the present invention; and FIG. 20 is a flowchart of the ultrasound detecting method threshold builder from FIG. 19.

DETAILED DESCRIPTION

Figure 1A:
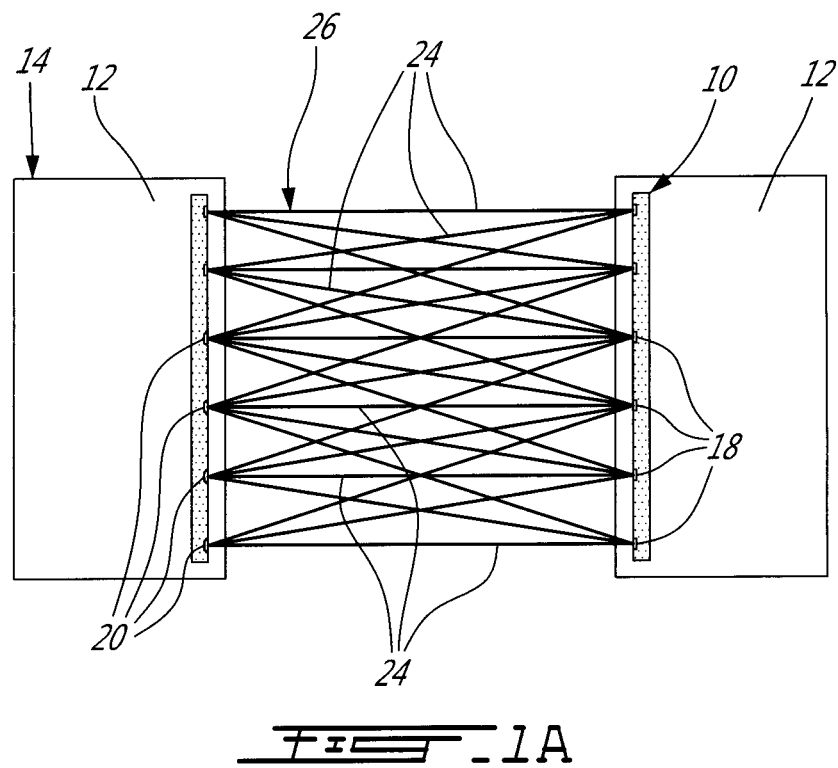
FIG. 1A is a schematic front elevation view of a presence detector for sliding doors according to a first embodiment, illustrating the crossing operational mode; the doors being illustrated completely opened.

In the following description, similar features in the drawings have been given similar reference numerals, and in order not to weigh down the figures, some elements are not referred to in some figures if they were already identified in a precedent figure.

According to embodiments of the present invention, there is provided a presence detector for a door assembly including a door which closes a door entrance, the detector comprising:

a transducer assembly mounted to the door assembly for emitting at least one ultrasound detecting beam adjacent the door entrance and for triggering a detecting signal indicative of a body located said adjacent the door entrance when the body intersects the at least one ultrasound detecting beam.

It is to be noted that the expression "body" is to be construed herein and in the appended claims as including a person, an animal, a limb or part thereof and an object, such as, without limitation, a parcel and a bag capable of reflecting or blocking an ultrasound beam.

The expression "door assembly" is to be construed herein and in the appended claims as including a door or a plurality of doors mounted to a door frame or more generally a door or a plurality of doors assembled together so as to selectively close an entrance.

The expression "door" is to be construed herein and in the appended claims as including any panel made from any material and having any shape and sizes which removably blocks an entrance.

The expression "door frame" is to be construed herein and in the appended claims as including any structural elements used to operatively mount the door, including a wall, a floor, a ceiling, a combination thereof and any assembly of beams, or mechanical parts.

The expression "temperature change" should not be used herein in any limited way and should be construed so as including any environmental change that my affect the speed of sound, including rain, snow, humidity, etc.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, un-recited elements.

Figure 1B:
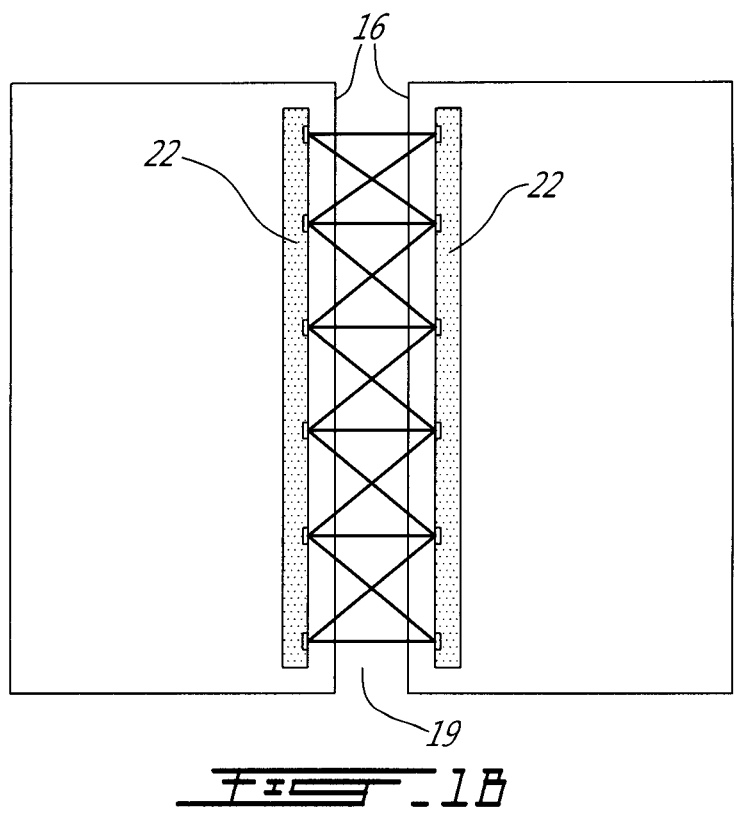
FIG. 1B is a schematic front elevation view of the system from FIG. 1A, illustrating the adaptation of the ultrasound beams as the doors close.

A first embodiment of a presence detector 10 for a door assembly 14, which includes door panels 12, is illustrated in FIGS. 1A-1B. According to the first embodiment, the door assembly 14 is in the form of elevator doors.

The sliding door panels 12 are slidably mounted to a door frame (not shown) so as to be reciprocal towards and away each other along a plane defined by the two doors 12. The two doors 12 are movable from a fully opened position illustrated in FIG. 1A to a fully closed positioned where facing lateral sides 16 of the doors abut and where the entrance 19 is closed. The automatic opening of the sliding doors 12 is controlled by any well-known technique. Since the operation of sliding doors is believed to be well-known in the art, and for concision purposes, it will not be described.

The presence detector 10 comprises a transducer assembly including two arrays of ultrasound transducers 18 and 20, each mounted on a respective door panel 12 adjacent their facing sides 16 therealong. The arrays 18 and 20 are mounted to the panels 12 via mounting beams 22. According to a further embodiment (not shown), the arrays 18 and 20 are directly mounted to the panels 12. Any mounting elements or means can be used to secure the transducer arrays 18 and 20 to the panels 12

The first array of transducers 18, which is mounted to the first door panel 12, is in the form of ultrasound emitters for emitting ultrasound detecting beams adjacent the door entrance parallel thereof and the second array of transducers 20 is in the form of ultrasound receivers mounted to the second door panel 12.

Each of the ultrasound emitters 18 is generally aimed in the direction of a plurality of ultrasound receivers 20 so as to create a plurality of ultrasound detecting beams yielding detecting lines 24 between the emitters 18 and receivers 20. These many lines 24 together define an acoustic detecting wall 26 closing the entrance 19.

The presence detector 10 according to the first embodiment further includes or is coupled to a controller (not shown), a pulse generator (not shown) coupled to the controller and a detector driver (not shown) coupled to the pulse generator. The emitters 18 are coupled to the controller via the sensor driver and the receivers 20 are coupled to the controller. The controller, pulse generator, sensor driver, and transducers 18-20 are connected to a power supply (not shown), in the form of a 12-24 DC (Direct Current) voltage source. Of course, the power supply may take other forms allowing energizing the presence detector 10.

The pulse generator includes an oscillating circuit and allows generating a pulsed signal having a frequency above the range of human hearing. This pulsed signal is amplified to the appropriate voltage and driven to the transducer 18 by the sensor driver. The transducers 18 converts the voltage from the driver to ultrasonic beams 24 that propagate through the air all through the receiver 20 unless a body intersects one of the beams 24.

The controller is further for collecting the signals and for triggering an alarm signal or sending a signal to the door controller (not shown) for preventing the door to close when one or a plurality of ultrasound detecting beams is or are intersected or crossed. The system 10 is therefore said to operate in a crossing mode. The controller of the system 10 is configured to recognize and therefore to respond to signals from the receivers 20 that are indicative of the presence or not of a body intersecting one of the detecting beams which is expected at each receiver 20.

Since ultrasound pulse generators and ultrasound detectors driver are believed to be well-known in the art, and for concision purposes, they will not be described furtherin in more detail.

Even though the presence detector according to the first embodiment is activated only when the doors 12 begin to close, the controller of a collision detection for a door according to a further embodiment (not shown) can be configured to remain activated at all time so as to monitor the crossing of the entrance 19, the alarm of the presence detector being activated only when the doors begin to move, or just before the door start to move.

As illustrated in FIG. 1B, the controller of the system 10 is configured so as to adapt the detecting line 24 configuration to the distance between the door panels 12. This allows modifying the density of the detecting wall 26 with the size of the entrance 19. More specifically, the controller modifies the triggering settings for each emitter 18 so that it emits in the direction for example of only two receivers 20 (see FIG. 1B) and then only in the direction of the facing receiver 20.

Even though the transducer arrays 18 and 20 have been described in FIGS. 1A and 1B as being mounted to the door panels 12 adjacent their facing sides' therealong, they can be mounted at other positions on the panels so as to create the detecting lines 24. A person skilled in the art would however appreciate from the above that the nearest the arrays 18 and 20 are mounted to the inner lateral side 16 of the panels 12, the easiest it is to adapt the number of detecting lines 24 with the distance between the two panels 12.

According to a further illustrative embodiment (not shown), each panel 12 can include a combination of emitters and receivers. According to a still further illustrative embodiment, the arrays 18 and 20 include transducers capable or both emitting and receiving ultrasound beams and reflectors on the opposite sides.

Figure 2:
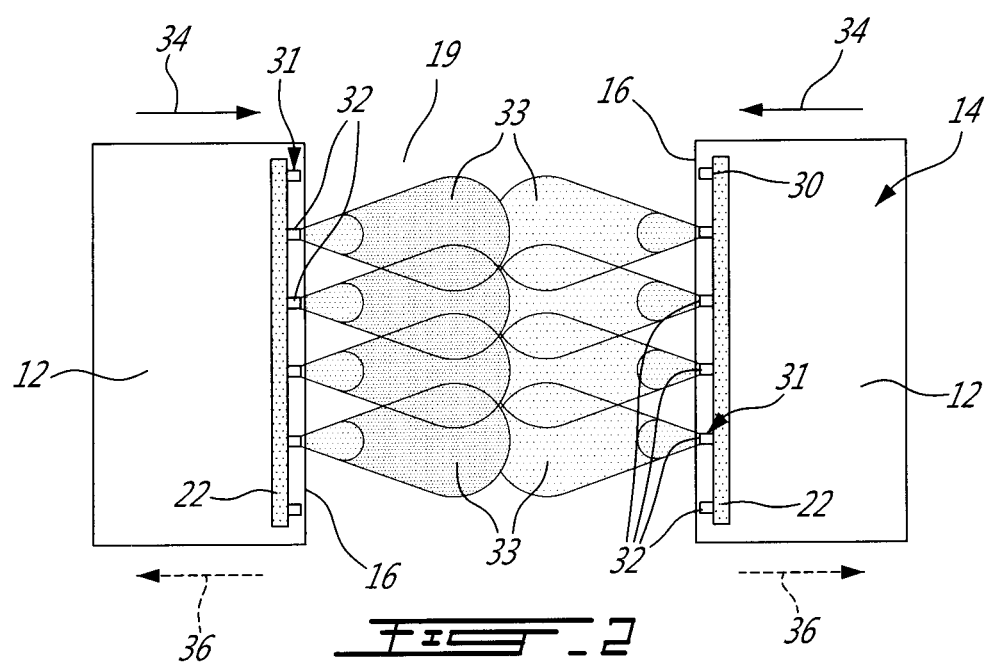
FIG. 2 is a schematic front elevation view of a presence detector for sliding doors according to a second embodiment, illustrating the ranging mode of operation.

A presence detector 30 for a sliding door assembly 14 according to a second embodiment will now be described with reference to FIG. 2. Since the system 30 is similar to the system 10, and for concision purposes, only the differences between these two detectors will be further described herein.

The presence detector 30 comprises a transducer assembly including two linear arrays 31 of ultrasound transducers 32, each array 31 being mounted on a respective door panel 12 adjacent the side 16 thereof facing the entrance 19 therealong. The arrays 31 are mounted to the panels 12 via mounting beams 22.

Each array 31 includes a plurality of ultrasound transducers 32 mounted to the side of the respective door 12 for sensing the reflection from a target within the proximity of the entrance 19 or at the entrance depending on the position and orientation of the transducers 32.

According to this second embodiment, each transducer 32 is said to operate in a ranging mode. The transducers are coupled to a controller (not shown) which is configured to drive the transducers 32 so that they emit and detect within a range which is dynamically adapted to the distance between the two door panels 12, or any other adjustment requirements. More specifically, the length of the detecting cone 33 and/or the nonsensitive area within the detecting cone can be modified during the door closing (see arrows 34) or opening (see arrows 36) of the door as the distance between the two panels 12 varies. The controller of the presence detector 30 is therefore coupled to the controller of the door assembly 14 (not shown). Both the excitation electronics and amplifier can be provided with control electronics that change the amount of excitations, including the duration and amplitude thereof, accordingly.

Figure 3:
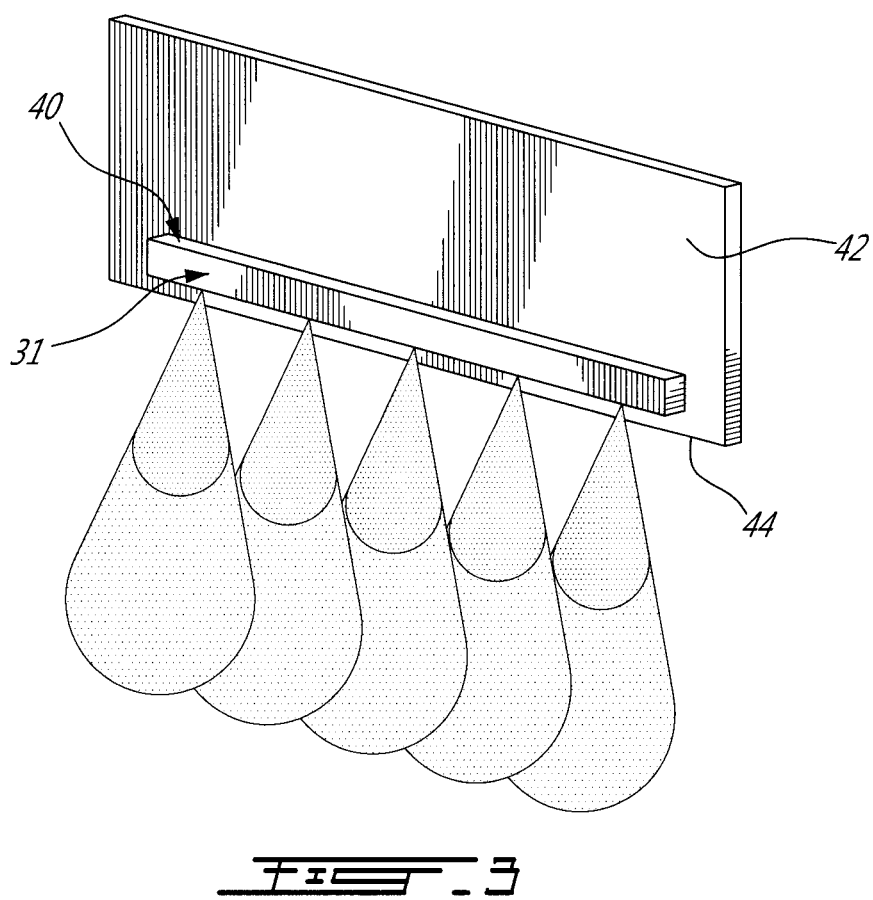
FIG. 3 is a schematic perspective view of a presence detector for a vertical sliding door according to a third embodiment.

As illustrated in FIG. 3, showing a presence detector 40 according to a third embodiment, one of the two arrays 31 of transducers 32 can be mounted to a vertical opening door 42, such as a conventional garage door. In that case, the transducer array 31 is mounted adjacent the distal side 44 of the door 42 to operate in ranging mode as described hereinabove. A door step (not shown) can also be provided with further transducers or reflectors to allow a crossing mode of operation, where the detecting distance may vary according to the door position in relation to the floor position as described hereinabove with reference to FIGS. 1A-1B.

FIG. 4 shows a presence detector 50 for a door assembly according to a fourth embodiment. Since the presence detector 50 is similar to the presence detector 30 from FIG. 2, and for concision purposes, only the differences between the two detectors 50 and 30 will be described herein.

The detector 50 includes a single arrays 31 of ultrasound transducers 32 mounted on one of the door panels 12 adjacent its side 16 facing the entrance 19 therealong. The transducers 32 generally aim at the lateral side 16' of the opposite door panel 12'. The transducers 32 operate in the ranging mode described hereinabove, wherein each transducer 32 more specifically operates within three detection zones: a dead zone 52 nearest the transducer 32, an active zone 54 further to the transducer 32, and a non active zone 56 between the dead and non-active zones 52 and 56.

In addition to be adapted to the relative position of the door panels 12, the sensitivity of the transducers 32 is further adapted for each selected zone. This allows tailoring the detecting precision where with the spatial probability of detection of a body in the entrance during closing of the doors 12. The active zone can be divided into several sub-zones to accommodate certain obstacles such as a rail of the power doors or any other part of the door assembly including the door frame should it be within the detecting zone of the transducers 32.

Also, it is to be noted that the number and delimitations of the zones may vary depending on the application and on the configuration of the door assembly or of the detector 50. For example, according to a further embodiment (not shown), the dead zone is eliminated when each single transducer 32 is replaced by a pair of adjacent transmitter and receiver.

According to a further embodiment, the detector 50 is configured so that the number and range of the detection zones varies as the door panels 12 move.

With reference to FIG. 5, a presence detector 60 for a sliding door assembly 14 according to a fifth illustrating embodiment will now be described. The presence detector 60 includes both the arrays of transducers 18 and 20 from the system 10 and the array 31 from the system 50 and is configured to operate in a dual mode which include both the crossing mode of operation which has been described hereinabove with reference to FIGS. 1A-1B and the ranging mode of operation, which has been described hereinabove with reference to FIGS. 2-3. The controller is configured to allow both modes of operation with either the same transducer or different transducers.

According to still a further embodiment of a presence detector for a door assembly (not shown), both the presence detector and the door assembly being similar to those illustrated in FIG. 5, the detector is more specifically adapted for close range sensing such as for elevator applications. A pair of adjacent transducers, an ultrasound emitter and an ultrasound receiver, are used instead of a single transducer to eliminate the initial dead zone.

It is to be noted that any combination of embodiments of presence detector for doors which are configured for operation in crossing and dual modes as described herein can be combined to achieve a dual mode of operation. For example, both transducer arrays 31 shown in FIG. 2, configured or not so as to operate in a multi-zone mode can be combined with the array of transducers 18 and 20 from FIG. 1 or any other array of transducers described herein which is configured to operate in the crossing mode.

According to a further illustrative embodiment (not shown), the same transducers are alternatively used for the ranging and crossing modes. The controller is then used to alternate between each independent mode of operation.

Figure 6:
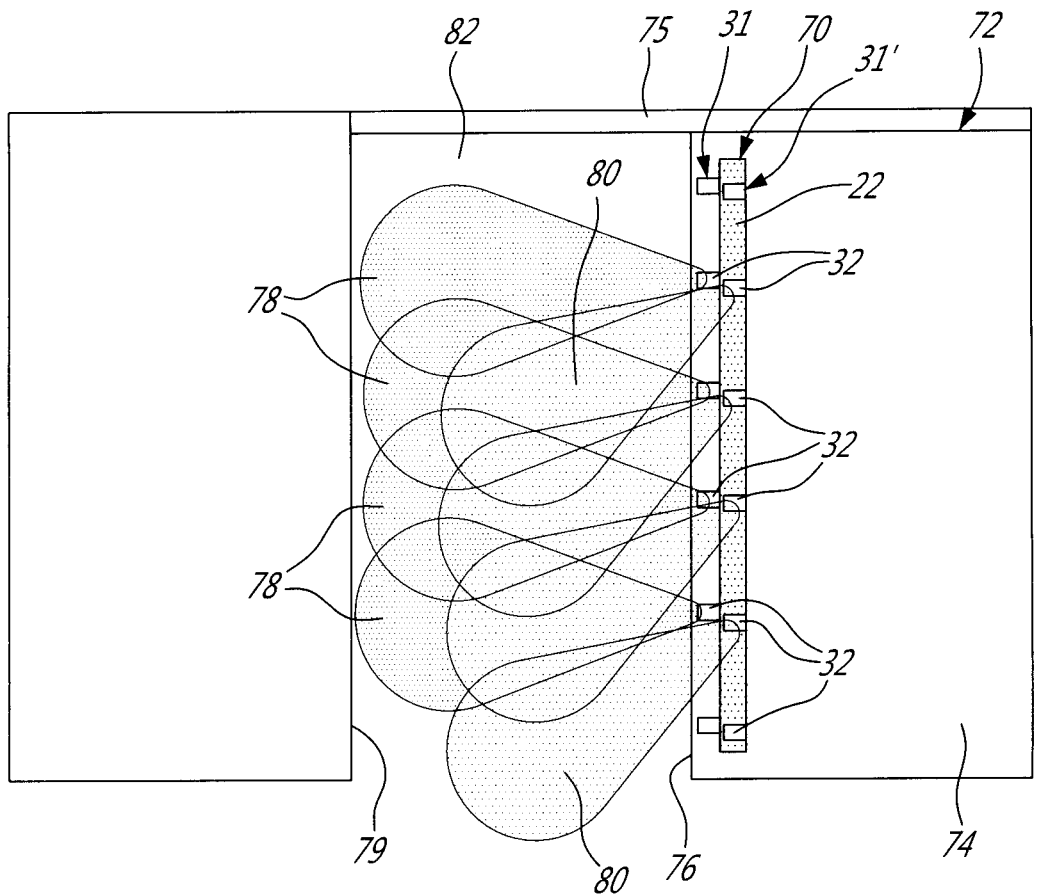
FIG. 6 is a schematic front elevation view of a presence detector for pivoting or swing doors according to a sixth embodiment, further illustrating the ranging operational mode.

As can be seen in FIG. 6, showing a presence detector 70 for a pivoting door assembly 72 according to a sixth embodiment.

The detector system 70 includes first and second linear arrays 31-31' of ultrasound transducers 32, each mounted to a door panel 74 of the door assembly via a mounting beam 22. The door panel 74 is pivotally mounted to a door frame 75, which is also part of the door assembly 72, via one of its lateral side 76. The transducer arrays 31-31' are mounted to the door panel 74 adjacent this same lateral side 76 so that the detecting beams 78 and 80 from each respective array 31 and 31' are oriented in two perpendicularly directions so as to allow continuing covering the entrance 82 as the door 74 pivots. The number and orientation of the transducers 31-31 may be different to those illustrated so as to cover different area of the door entrance 82.

The system 70 further includes a controller (not shown) as described hereinabove. The controller and the ultrasound transducers 32 are configured to operate in the ranging mode.

The system illustrated in FIG. 6 can be modified to operate in the crossing or dual mode by mounting transducers or reflectors (not shown) to the side 79 of the frame 75 of the door assembly 72 opposite the hinged side 76 thereof.

Figure 7A:
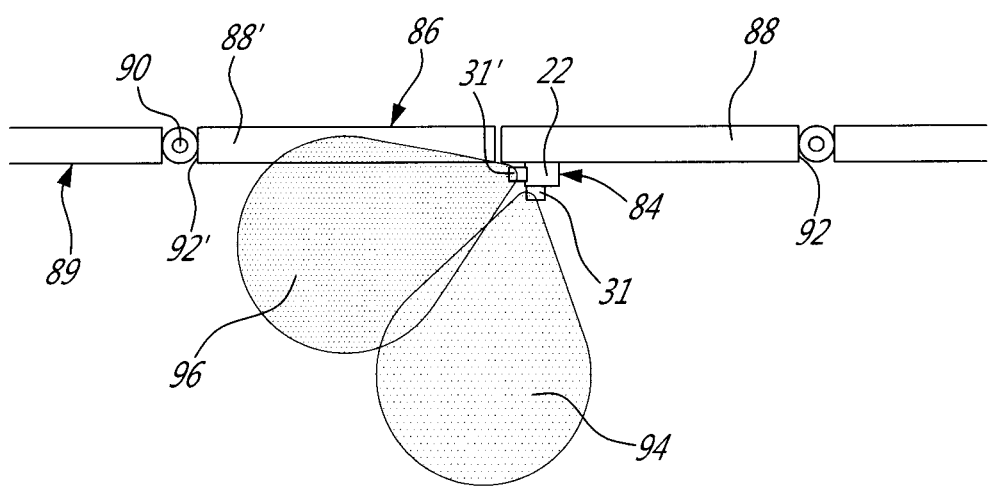

A presence detector system 84 for a door assembly 86 according to a seventh embodiment is illustrated in FIGS. 7A-7C. The pivoting door assembly 86 includes a pair of pivoting doors, each defined by a door panel 88-88' pivotably mounted to a door frame 89 via motorized hinges 90. The door panels 88-88' are each mounted to the door frame 89 via their respective opposite lateral sides 92-92'.

The system comprises first and second linear ultrasound transducer arrays 31-31' of ultrasound transducers 32 mounted to one of the door panels 88 of the door assembly 86 via a mounting beam 22 on the side thereof opposite the hinge 92.

The arrays 31-31' are coupled to a controller and operated in the ranging mode described hereinabove.

As can be seen from FIGS. 7A-7C, illustrating the pivoting doors in respectively a fully closed, a half opened and fully opened position, the detecting beams 94-96 (only two shown) created by the arrays 31-31' move along with the panel 88 for an constant coverage of the door entrance 91 as the system operate in a ranging mode.

The system 84 can be modified so that ultrasound transducer arrays 31-31' are provided on both pivoting doors 88.

It is to be noted that the position of the arrays 31-31' may vary on the panel 88. Also, the number of linear or non-linear arrays for each door 88 and 88' and the number of transducers 32 on each array 31-31' may also vary depending on the application, the door configuration and/or the desired detection precision.

The system 84 may also include a supplementary transducer, which can be part of the array 31 or can be independent therefrom, and a reference target (both not shown) positioned at a known distance from the supplementary transducer so as to allow correction for any change in the speed of sound due to environmental changes. Indeed, by computing the time of flight of an ultrasound beam from the transducer to the reference target, the speed of sound may be determined knowing the distance between the target and the transducer. This allows more accurate control of the active detection zone and therefore increases system sensitivity. This method further allows instantaneous response to the change without any lagging which may occur when one uses thermometer to gather temperature information.

Figure 8A:
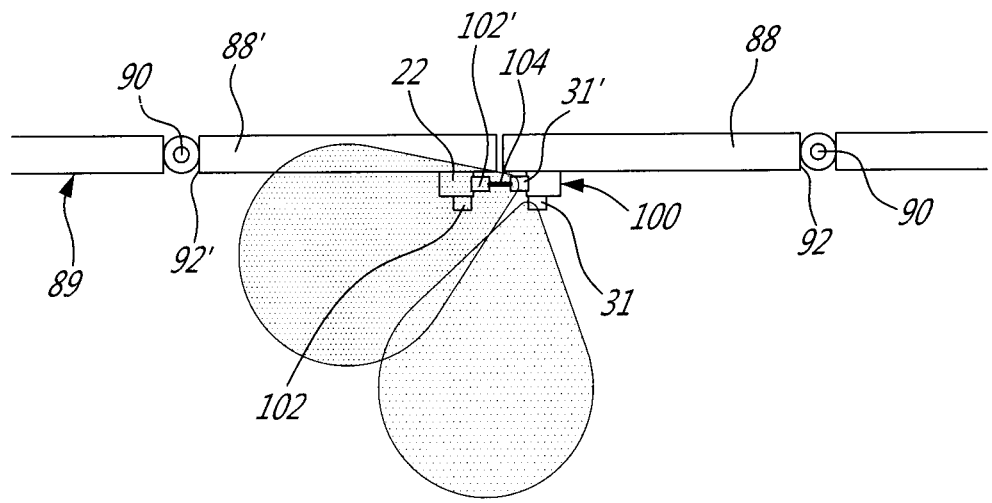
Figure 8B:
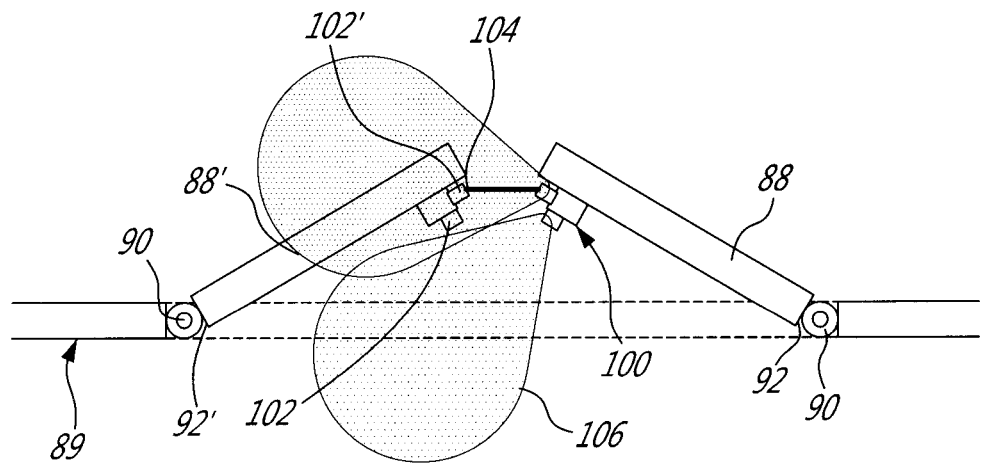

FIGS. 8A-8C illustrate a presence detector for pivoting doors 100 according to an eighth illustrating embodiment. Since the detector system 100 is very similar to the system 84, and for concision purposes, only the difference between the two detector systems 100 and 84 will be described furtherin.

The system 100 differs to the system 84 as follows so as to enable the dual mode of operation, which includes the ranging and crossing modes described hereinabove:

the second door panel 88' is further provided with first and linear arrays 102-102' of ultrasound transducers configured for both emitting and receiving or pairs of ultrasound receiver and transmitter via a mounting beam 22 on the side thereof opposite the hinge 92;

the controller (not shown) and the arrays 31-31' are configured to emit further ultrasound detecting beams that yield detecting lines 104 (only one shown) to achieve the crossing mode described hereinabove. As further described hereinabove, a single transducer may create a plurality of detecting lines with more than one receiver in this case each transducer of either array can be configured and controlled so as to be either or both receiver and transmitter;

also, as can be seen from FIGS. 8A-8C, the controller of the system 100 is coupled to the automatic door controller (not shown) so that the controller may alternate between the first and second arrays 31 and 31' so that detecting lines 104 remain across the entrance 106 while the doors 88-88' pivot.

It is believed to be within the reach of a person skilled in the art to adapt the system 100 for a sliding door assembly. In both cases, the system can be configured to use one of the 'crossing lines' to determine the door position. Such position can then be used to modify the detecting zone accordingly with to the door position, and or other parameters.

Figure 9A:
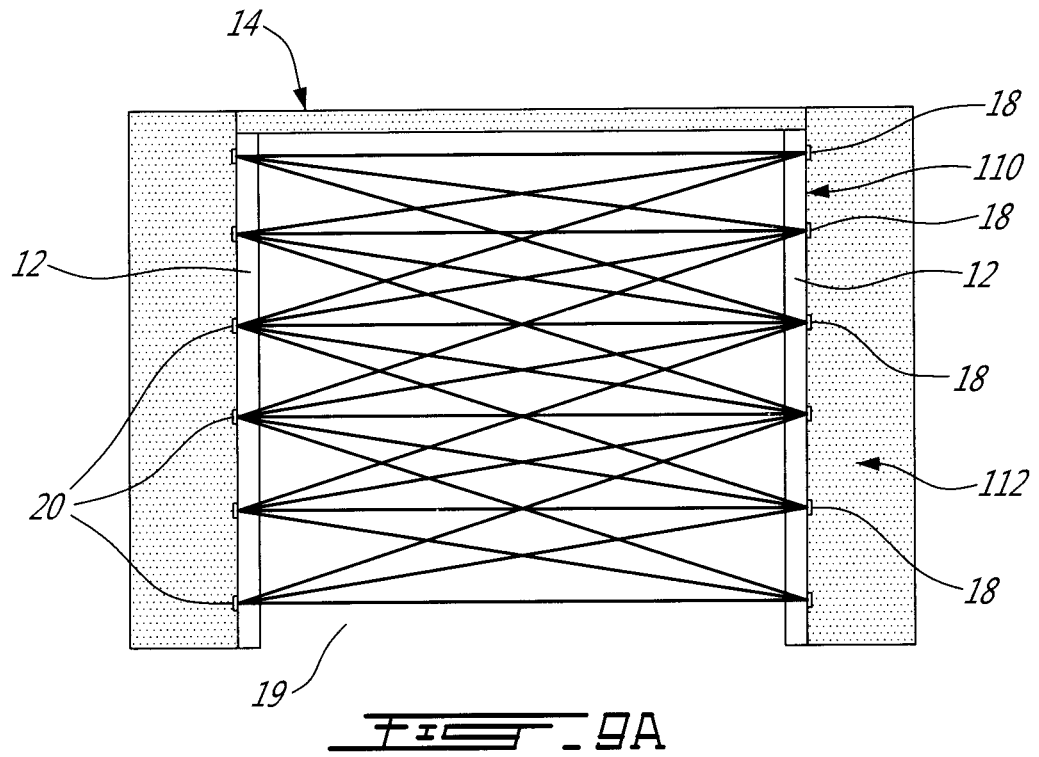
FIGS. 9A-9B are front elevation schematic views of a presence detector for sliding doors according to a ninth embodiment; illustrating the ultrasound transducer mounted to the door frame.
Figure 9B:
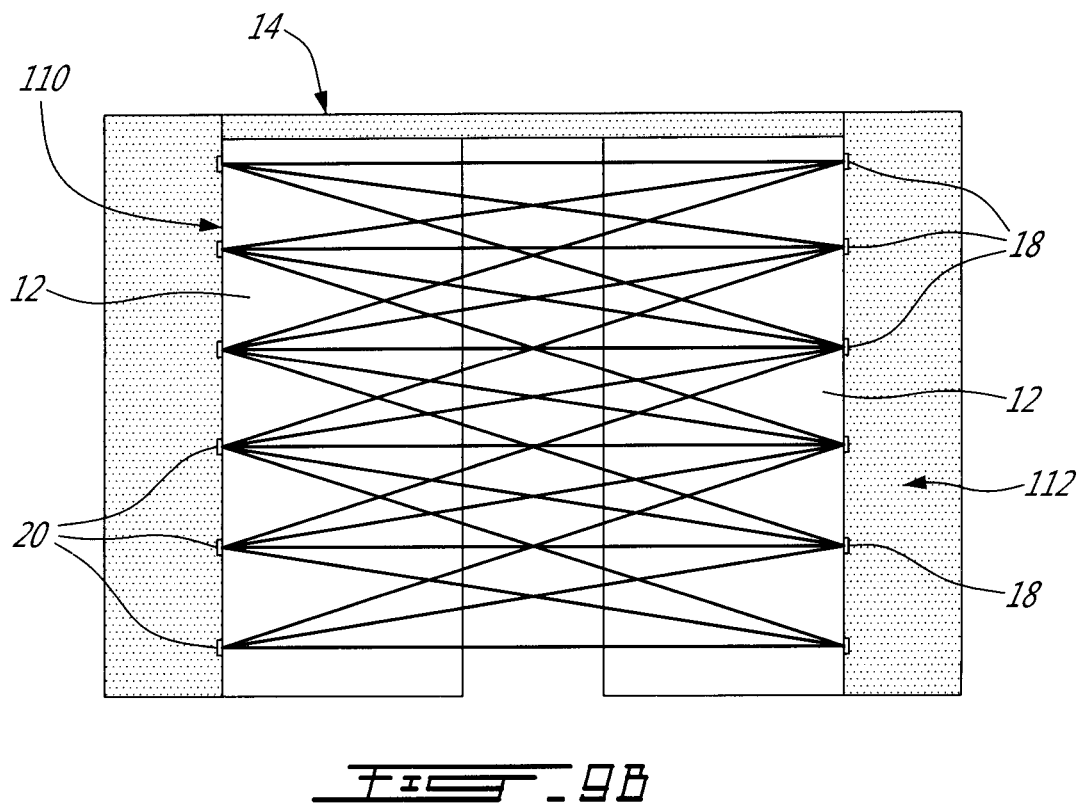

FIGS. 9A-9B illustrate a presence detector for sliding doors 110 according to a ninth embodiment. Since the detector 110 is similar to the detector 10, and for concision purposes, only the differences between the two detectors 110 and 10 will be described herein below in more detail.

One of the differences between the presence detectors 110 and 10 is that the ultrasound transducers 18 and 20 are mounted to the fixed door frame 112 (or other fix point) on opposite lateral side of the entrance 19. A further difference of the detector 110 with the detector 10 is that the detector 110 does not change for the distance between the door panels 12 and therefore does not reduce the number of detecting lines while the door is closing.

Figure 10A:
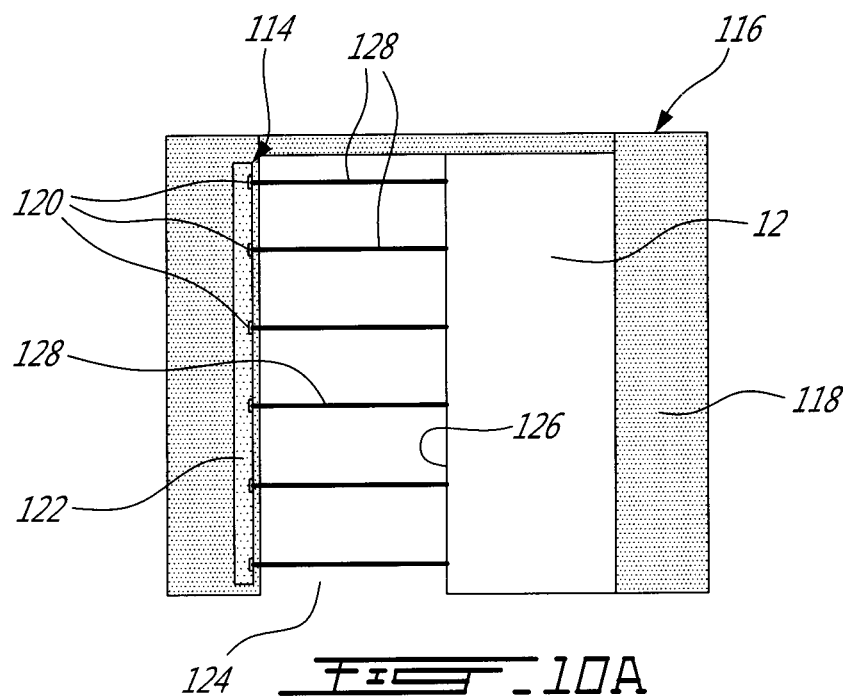
FIGS. 10A-10B are schematic front elevation views of a presence detector for a single sliding door according to an eleventh embodiment; illustrating the mounting of the ultrasound transducer to the door frame and the further use of the detector to determine the position of the door.
Figure 10B:
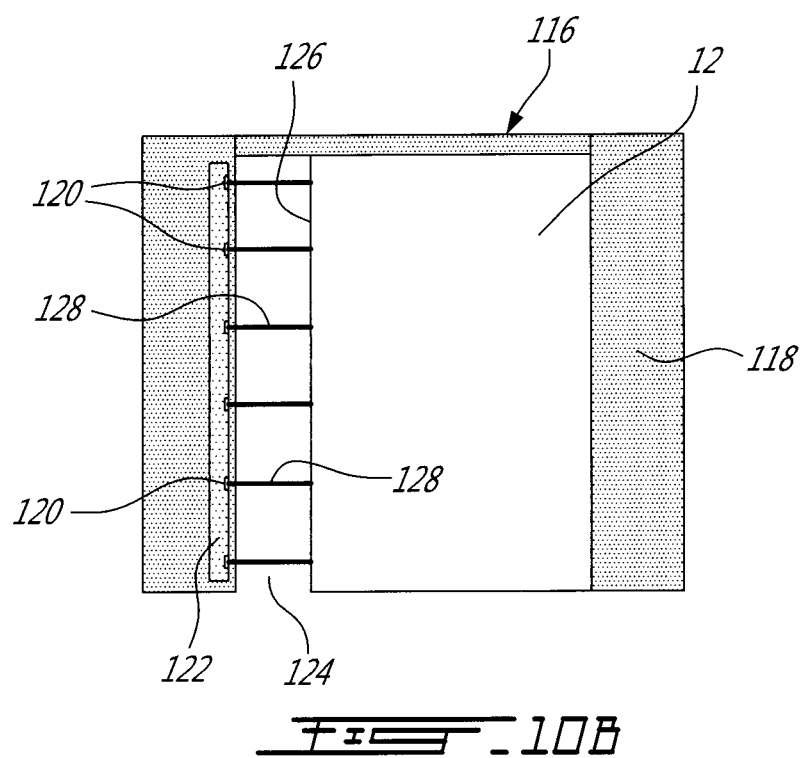

FIGS. 10A and 10B illustrate a presence detector 114 for a sliding door assembly 116 according to a tenth embodiment. Since the detector 114 is similar to the detector 110, and for concision purposes, only the differences between the two detectors 114 and 110 will be described herein.

The door assembly 116 includes a single door panel 12 slidably mounted to a door frame 118. The detector 114 includes a linear array of ultrasound transducers 120 mounted on the door frame 188 via a mounting beam 122. The mounting beam 122 is secured to the frame 114 along the entrance 124 so as to be aligned with the free lateral side 126 of the door panel 12. The ultrasound transducers 120 emit detecting beams towards the door panel 12 and create detecting lines 128 with the reflection therefrom. The controller (not shown) is therefore configured to drive each transducer 120 so that it alternates between the emission and detection of the ultrasound detecting beams. Using conventional time of flight calculation algorithm, the detector 114 can be further used to determine the position of the door 12 relative to the mounting beam 122.

As discussed hereinabove, the presence detector 114 can be modified to further operate in a ranging mode (not shown) yielding a dual mode of operation. Also, the presence detector 114 can be modified so that the transducers 120 feed the controller with the door position further allowing, for example, with sound speed correction.

Figure 11A:
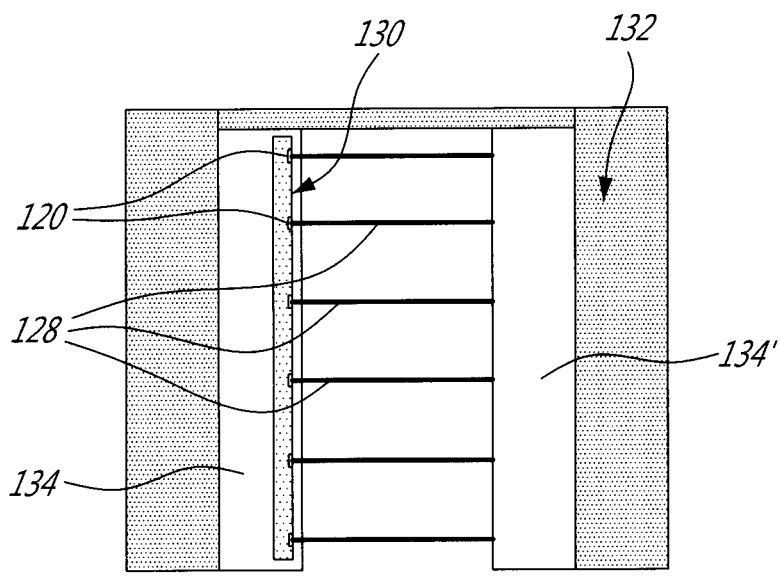
FIGS. 11A-11B are schematic front elevation views of a presence detector for sliding doors according to a twelfth embodiment; illustrating the mounting of the ultrasound transducer to one of the door panels and the further use of the detector to determine the position of the door.
Figure 11B:
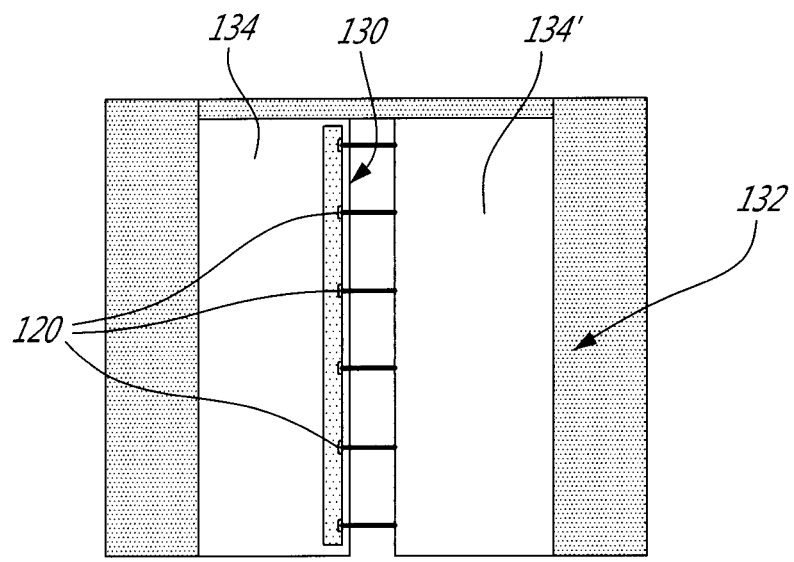

The presence detector for a door assembly 130 according to a thirtieth embodiment shown in FIGS. 11A-11B is very similar to the detector 114 from FIGS. 10A-10B and as such only the differences will be described herein.

More generally, such detectors 114 and 130 allow controlling the door(s) 112 and 134 respectively.

Indeed, each of the detectors 114 and 130 allows determining the change of position of the door(s) over time by calculating the time of flight of the detecting beams emitted by the transducers 120 therefrom to the side of the door panel 12 or 134' and then reflected back to the transducer 120.

The change of position of the door(s) 112 or 134-134' over time can be used by the door assembly controller or any other controller to determine other changing parameters of the door (s) 112 and 134-134' such as the speed and acceleration thereof. Such information can be used to improve the control of the door(s).

Figure 12A:
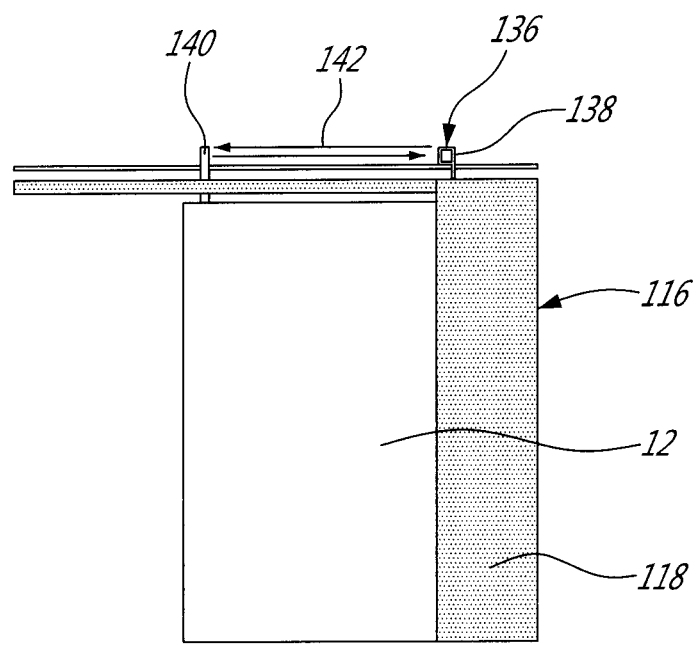
FIGS. 12A-12B are schematic front elevation views of a door position detector according to a further aspect of the present invention.
Figure 12B:
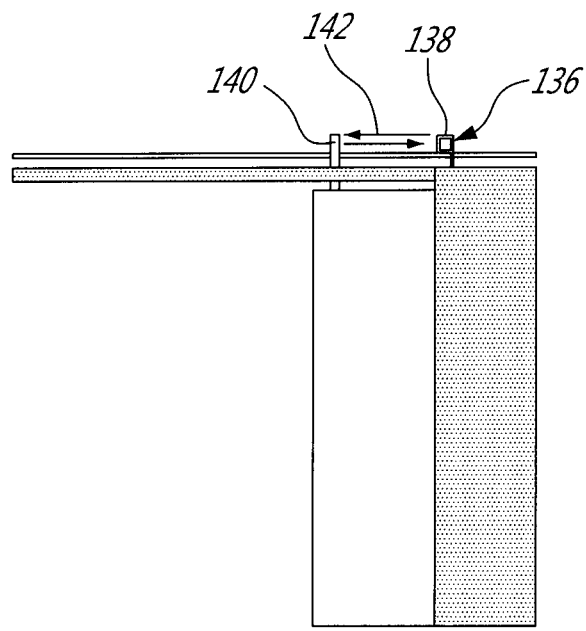

FIGS. 12A-12B illustrates an embodiment of a door position detector 136. Such a detector can be used for example in addition to a presence detector for a door assembly including a sliding door according to an embodiment of the present invention, such as the detectors 10, 30, 40, 50, 60 and 110, to determine the change of position of the door(s) and/or other related parameters.

The detector 136 comprises an ultrasound transducer 138, in the form of an ultrasound emitter, secured to the door frame 118 above the door panel 12 on the side thereof. The detector 136 further comprises a reflector 140 mounted to the door panel 12 so as to extend from the frame 118 and as to be in the line of sight of the emitter 138. The detector 136 further comprises or is coupled to a controller (not shown) which receives the signal from the emitter 138 and repeatedly determines the distance between the emitter 138 and the reflector 140 and therefore the variation of position of the door panel 12 relative to the frame 118.

As described hereinabove, the reflector 140 can be replaced by an ultrasound receiver. A person skilled in the art would appreciate that the positions of such reflector 140 or receiver and of the emitter 138 can be switched.

Even though the detector 136 has been illustrated mounted to a door assembly 116 having a single sliding door panel 12, it can be mounted to a door assembly having two door panels such as the assembly 112. In such a case, a single door position detector 136 can be used, for example when both door panels 12 are operated by a single mechanism (not shown), or two door position detector 136 can be used, each one for detecting the position of a respective panel 12 relative to the door frame.

Assessing the position of the door over a short period of time allows for example determining the precise position of the door at any time such as when the door is fully opened or fully closed. This information can be used in a decision algorithm following the door hitting a body (not shown).

More generally, the door position detector 130 or 136 establishes detecting lines (respectively 128 and 142) between the door and a reference, wherein the length of these lines changes according to the position of the door. Since the detector 130 or 136 knows when the transducer(s) 120 or 138 emit(s), the detector 130 or 136 can determine the position of the door and the reference based on the time of flight. These distance measurements are performed at a high repetition rate, such as typically every one tenth of a second, allowing measurement of the door speed and door acceleration/deceleration. The door position detector 136 can therefore be used as or be part of a door controller.

Turning now to FIG. 13, a presence detector 150 for a power door assembly 152 according to a thirtieth embodiment will now be described.

The power door 152 includes a door panel 154 pivotally mounted to a frame 156 via a hinge 157 (see on FIG. 14A) and an actuator 158 including a motor 160. A door activator (not shown), including a presence detection independent from the detector 150 is provided to activate the power door 152. Since power doors are believed to be well known in the art, and for concision purposes, they will not be described furtherin.

The detector 150 comprises ultrasound transducers array 160-160' acting both as an emitter and a receiver, each mounted on the door panel 154 on a respective side thereof, each creating a detecting cone which yields an acoustic footprint 161-161' in front thereof and moving therewith.

The detector 150 further comprises a controller (not shown) which drives the transducers 160-160' so that they emit up to a certain distance from the floor 162 in the ranging mode. The length of the detecting cone 161-161' of each transducer 160-160' can be adjusted to detect object at a required height above the floor so that the detector 150 ignores the floor 162 and any small objects laying thereon, such as paper cans or the likes.

In operation, with reference to FIG. 13, the controller of the detector 150 receives a signal from the transducer 160 indicative of a presence of an obstacle 166 at close proximity to the door 154 and therefore can send a signal preventing the opening of the door 154 to prevent a collision between the obstacle 166 and the door 154.

It is reminded that the detector 150 is configured to ignore the floor 162 and therefore will not generate false alarm due to changes thereof while the door 154 moves.

Figure 14A:
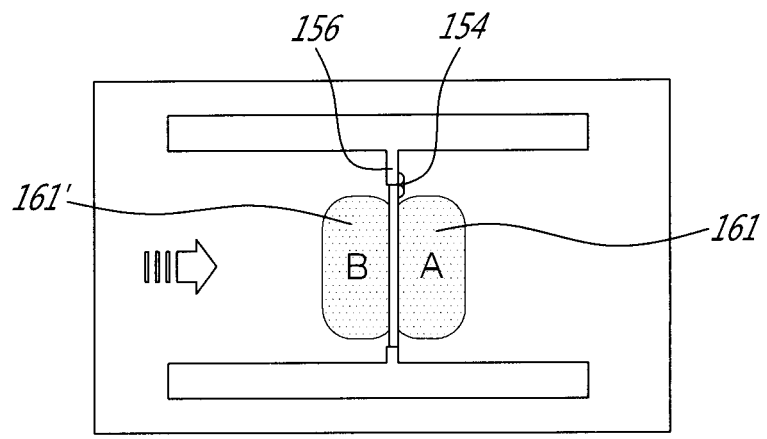
FIGS. 14A-14C are schematic top plan partly sectional views of the power door from FIG. 13, illustrating the operation of the presence detector from FIG. 13.
Figure 14B:
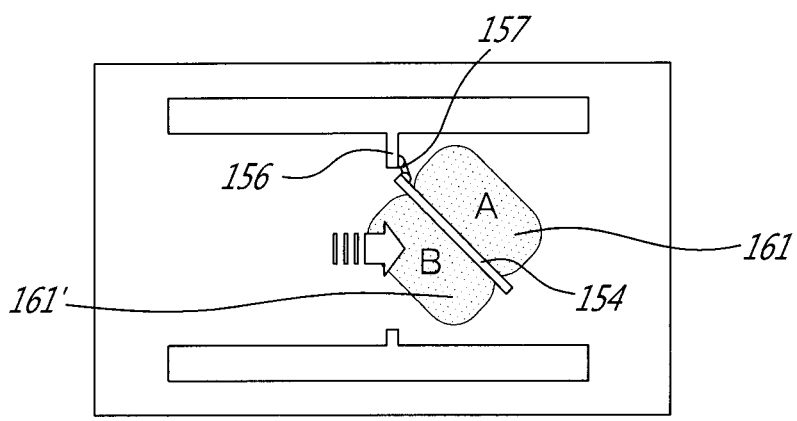
Figure 14C:
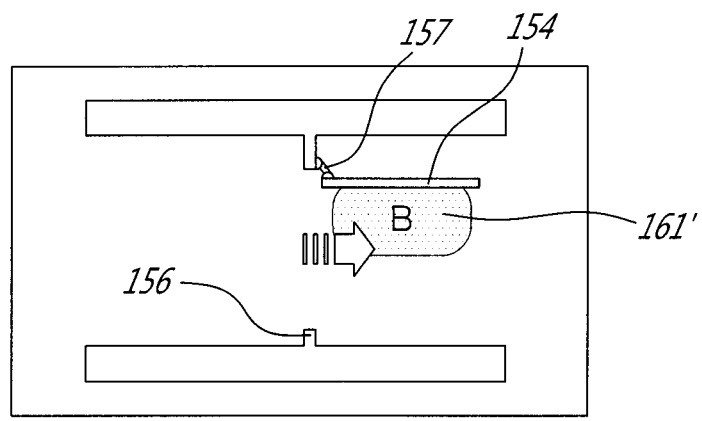

As can be further seen from FIGS. 14A-14C, the controller of the detector 150 is coupled to or is the same than the door activation system controller so that the acoustic footprints 161-161' size or presence can be adapted to the door panel 154 position. The system can also be self contained by measuring the door position as it has been described hereinabove.

Furthermore, the detector 150 may be modified to further include an acoustic active speed calibration sensor (not shown) to better the control on the detecting distance. Such acoustic calibration sensors use a reference target at a known distance to calibrate for changes in the speed of sound due to the environment changes as it has been described hereinabove. This allows measurement of speed change adapted to the environment without delay due cause by phenomena such as heat capacity.

According to a further embodiment (not shown), the presence detection 150 is also used for both activation of the power door 152 and collision avoidance.

A presence detector 170 for a sliding door assembly 14 according to a fortieth embodiment is illustrated in FIG. 15. The detector 170 is part of the activation system (not shown) of the sliding door assembly 14 which has been described with reference to FIGS. 9A-9B.

The detector 170 comprises a pair of ultrasound transducers 160 (only one shown), acting both as an emitter and a receiver, and which are mounted above the sliding doors 12 on a respective side thereof, so as to each project a detecting beam 172, 172' in front of the entrance/exit 19 in the above-described ranging mode.

The two detecting beams 172-172' are generally in the form of cones which extend from the transducers 160 adjacent the floor 174 but not up to the floor 174 so as to minimize false alarm as discussed hereinabove. An active sound speed correction as discussed with reference to the previous embodiment can further be applied to the detecting beams 172-172'. The transducers 160 are coupled to a controller (not shown) which drives the emitting beams and control the detection range so that they emit up to a certain distance from the floor 174 in the ranging mode described hereinabove. In some application, the detector uses the floor 174 as a reference and detects just above it.

According to a further embodiment, the detector 170 is further configured to learn and store information about any stationary targets that has been left near the entrance for a predetermined time sufficiently long so as to consider such targets part of the door assembly 14.

The transducers 160 may be replaced by any type of transducer assembly capable of operating in ranging mode and the detector 170 is not limited to emit detecting beams 172-172' being conical or ellipsoid in shape.

Moreover, the detector 170 can be modified to be used in activation system for a door assembly having another configuration than the assembly 14. A presence detector 180 for a power door assembly 182 according to a fifteenth embodiment will now be described with reference to FIG. 16A.

The power door assembly 182 includes a door frame 184 having a side barrier 186, a door panel 188 pivotally mounted to the frame 184 via a hinge (not shown) and an actuator, including a motor (both not shown), as described with reference to FIG. 13. The door actuator further includes an encoder (not shown) which reads and transmits the door position 189

Since the encoder is believed to be well-known in the art, it will not be described herein in more detail. The encoder may be replaced by an acoustic sensor as it has been described previously (not shown) or by any other means allowing to measure and transmit the door position.

The detector 180 comprises an ultrasound transducer assembly including one or more (three are shown) ultrasound transducers 190-194 mounted on top of the door panel 188 so as to be generally equidistance and for projecting respective detecting beams 196-200 in front of the door panel 188 towards the floor 202.

Figure 16A:
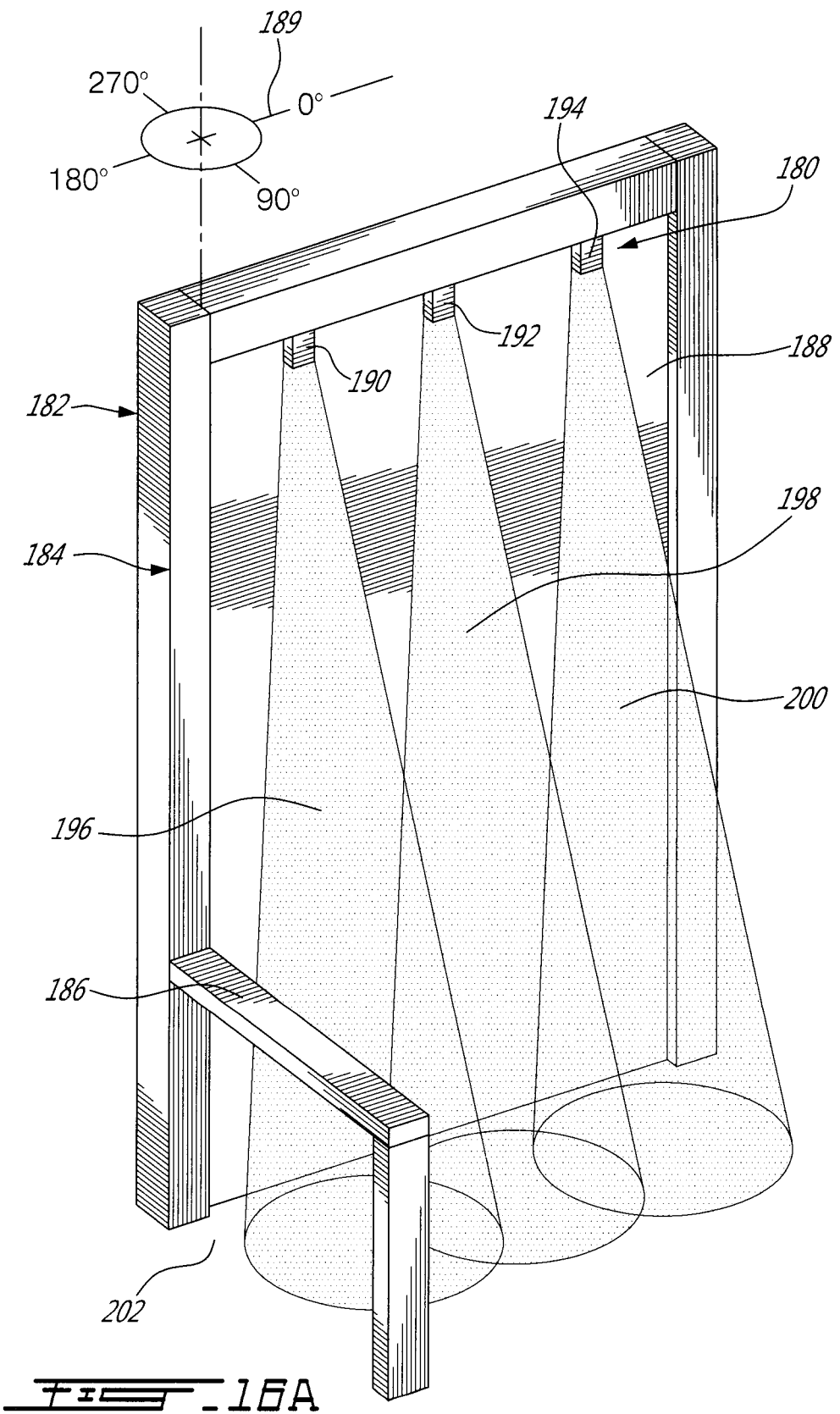
Figure 16C:
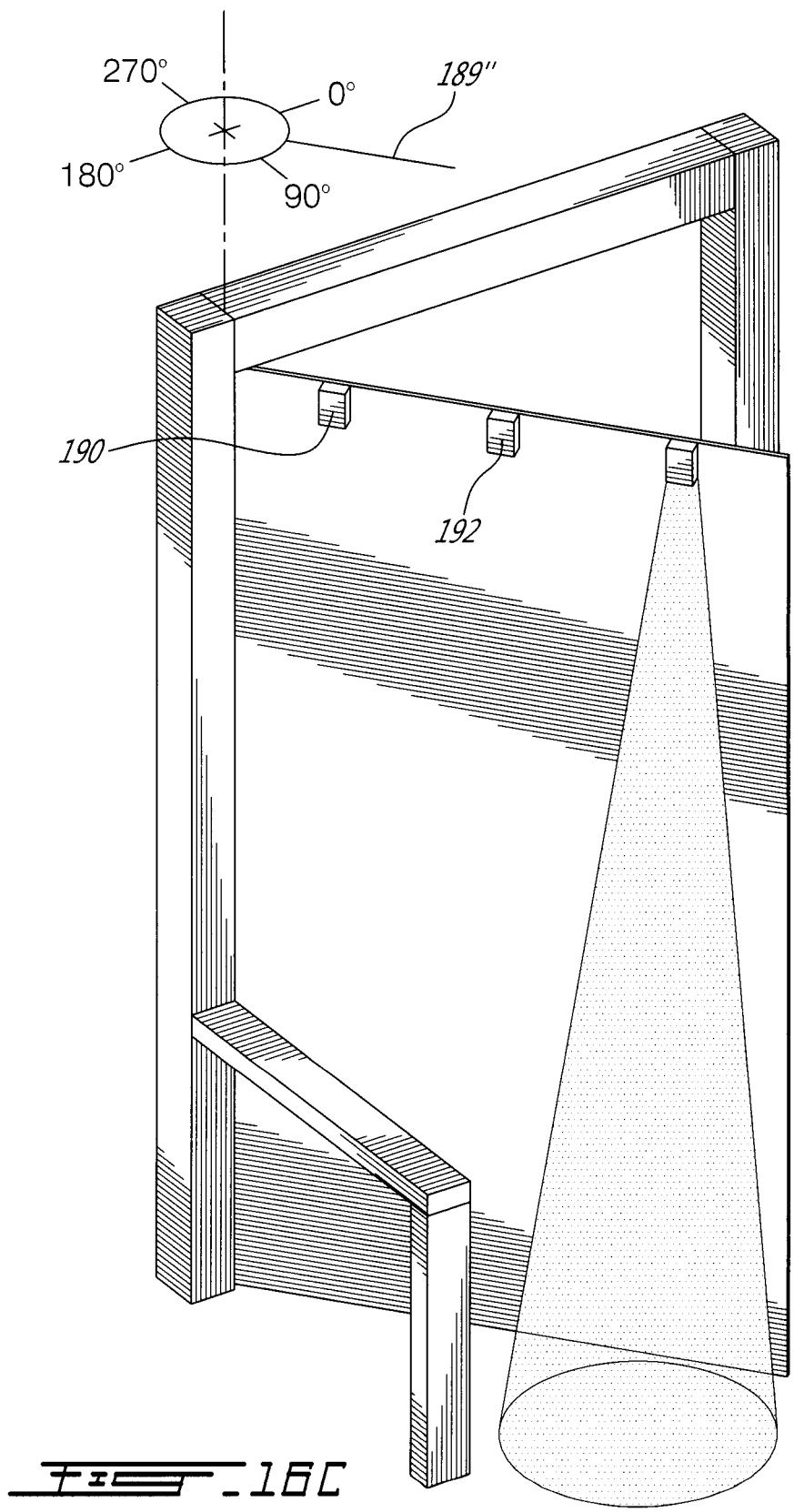

The detector 180 further comprises a detector controller (not shown) which drives the transducers 190-194 so that they emit up to a certain distance from the floor 202 in the ranging mode. The transducers 190-194 are therefore configured and controlled for both emitting and receiving ultrasounds signals. As will now be described with reference to FIGS. 16A-16D, the detector controller is coupled to the door controller so that the operation and detecting range of the transducers 190-194 are adapted to the position of the door 188 relative to frame 184. The detector controller can further be configured so that the operation and detecting range of the transducers 190-194 are adapted to the environment condition as described hereinabove. The detector 180 is configured so that all transducers initially transmit to the maximum range. Then, as shown in FIG. 16B, when the detector controller receives a signal from the activation controller indicative that the door panel 188 is opened from at least a first predetermined angle 189' relative to the door frame 184 (about 25 degrees in FIG. 16B), the first transducer 190 is turned off to avoid false alarm that would be caused by the ramp 186. The detector 180 can be configured so that, alternatively, the range of the transducer 190 is reduced (not shown) instead of turning it off.

Similarly, and as can be seen on FIG. 18C, when the door panel 188 is opened wider so as to reach a second predetermined angle 189' (about 45 degrees according to this specific embodiment), the second transducer 192 is further turned off or its range is limited.

Figure 16D:
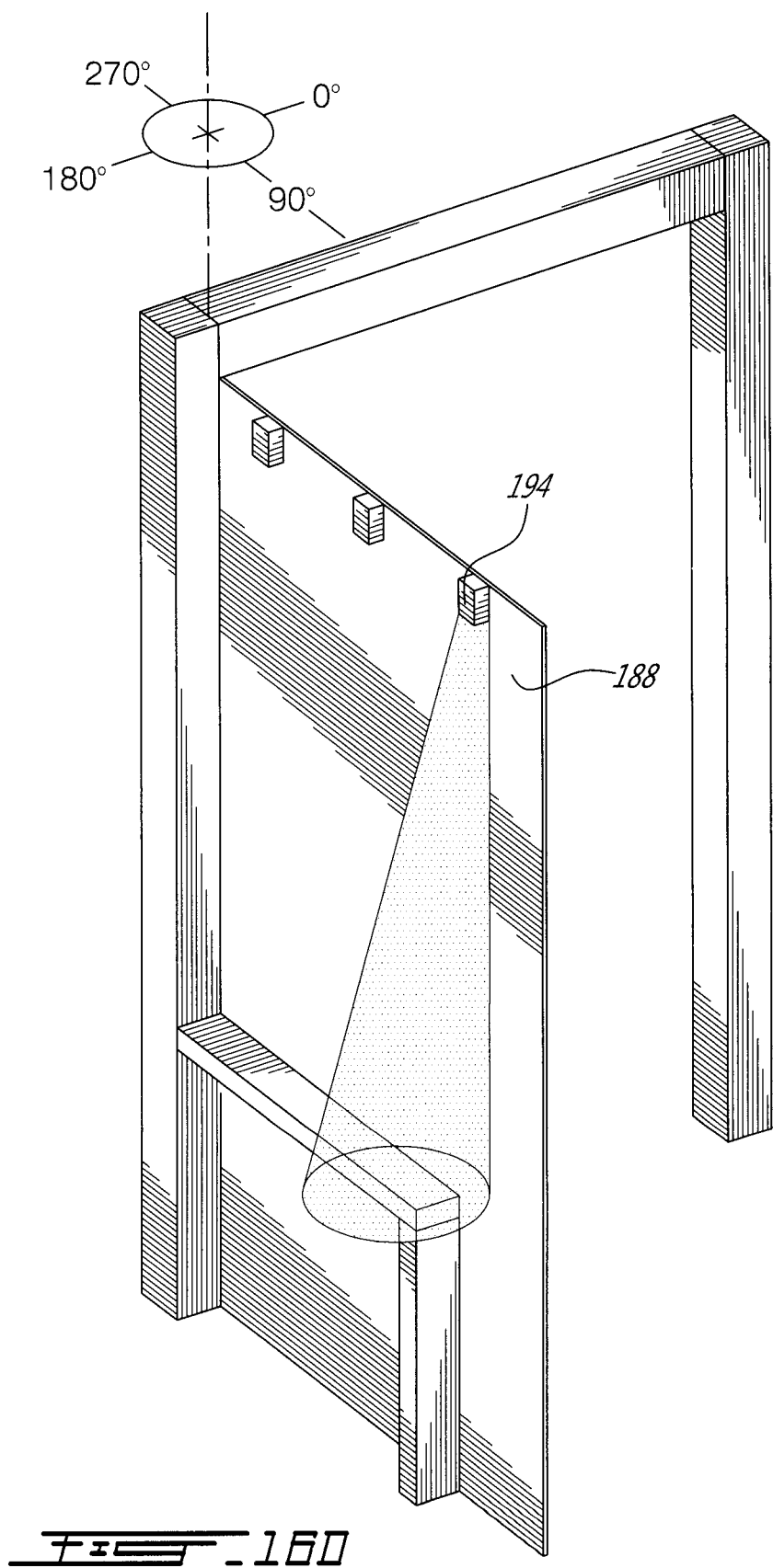

Finally, when the door 188 is fully opened as illustrated in FIG. 16D, the third transducer 194 is controlled so that it emits a detecting beam 200 which reaches just above the ramp or is turned off depending on the condition on the ground.

Even though the detector 180 has been described as being adaptable to a door assembly 182 provided with a frame 184 having a side ramp 186, the detector 180 can be modified, including the number and position of the transducers, so as to adapt to a door assembly having another configuration.

The above-illustrated embodiments of presence detectors for door assemblies that include ultrasound transducers configured to operate in ranging mode can be controlled and calibrated so that these transducers emit as close as possible to the floor when the transducer(s) emit vertically towards the floor or to the opposite door panel or frame when the transducers are position to scan horizontally such as illustrated in FIG. 4. In both cases, the ultrasound transducers are so controlled that the length of their scanning beam is sufficiently distanced from the opposite structure to cope for the uncertainty in the beam length caused by variations of temperature and other changes in the environmental conditions without causing false alarm by hitting the structure. As it is well-known in the art, such variations in the temperature cause changes in the speed of sound which yields a longer or shorter time of flight of the detecting beam.

According to further embodiments, any one of the above-described presence detector configured for operation in ranging or dual modes can be modified to include a temperature dependant sensor (not shown) coupled to the detector controller to measure the change in the speed of sound due to the change in the environment of the transducers and to transmit these measurements to the detector controller. The controller then uses these measurements to further control the sensitive distance so that the detecting beams remain as close as possible to the facing structure without declaring it as a legitimate target. Typically, with this method the detecting beams can sense up to about 25 mm from the floor or from the opposite structure.

This can be achieved using an ultrasound based speed compensating method which has been described hereinabove.

Figure 17A:
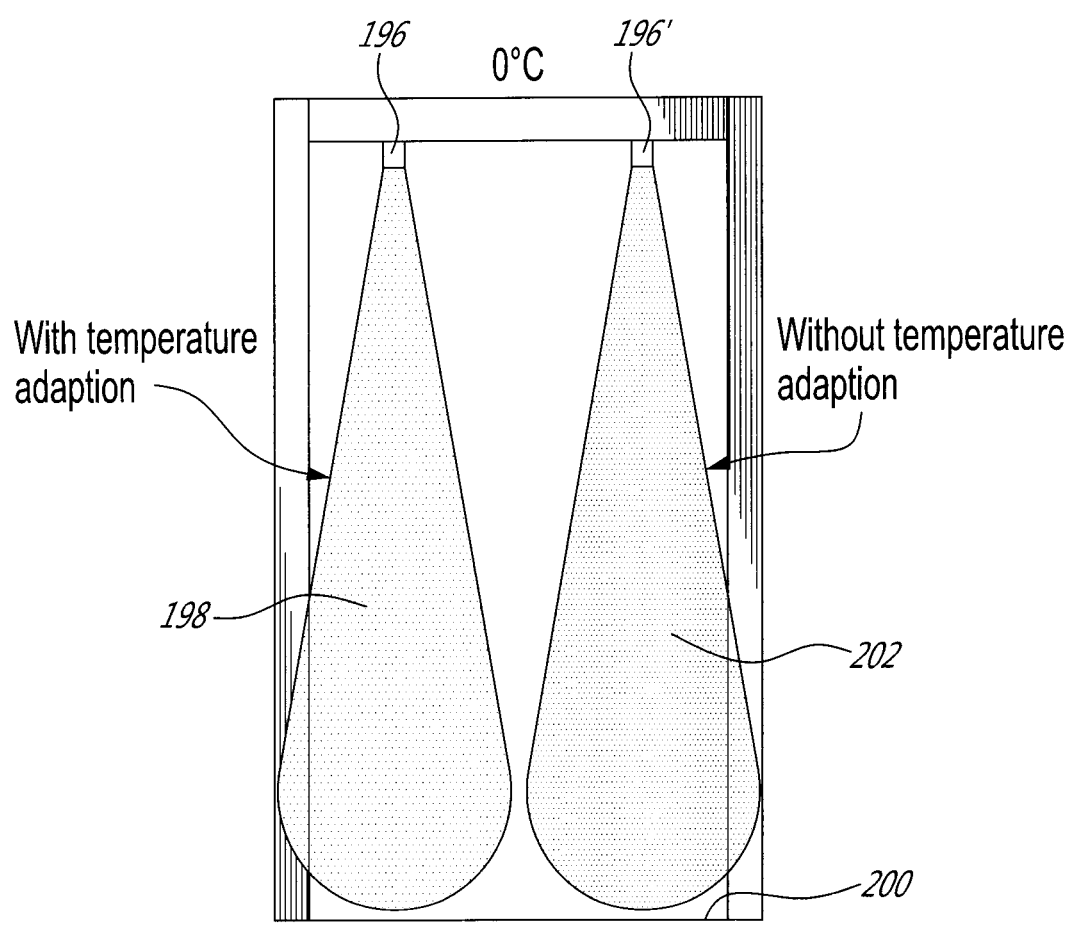

FIGS. 17A-17C illustrates the differences in beam length for two identical ultrasound transducers 196-196', the first transducer 196 being controlled so as that the length of the detecting beam it creates remains constant as the surrounding temperature changes.

FIG. 17A shows that the second transducer 196' has been calibrated so as to maximize the length of its detecting beam without contacting the floor 200 therewith for a temperature of 0° C. surrounding the transducer 196'.

FIGS. 17B and 17C illustrate respectively the lengthening and shortening of the detecting beam 202 as the temperature increases and lowers.

As can be seen from FIGS. 17A-17C, a beam without compensation would have to be created longer in order to compensate for possible changes in temperature. This would cause the beam to touch the floor in some temperature range rendering the system more prone to false alarm. Therefore traditionally, the initial beam is shorter and hence the detection zone is less predictable as it is most of the time further from the floor.

FIG. 18 shows the change in length of the detecting beam as the temperature surrounding the ultrasound transducer changes.

It is to be noted that many modifications could be made to the presence detectors for door assemblies described hereinabove, for example:
  the number of transducers forming the transducer assembly may of course vary depending for example on the application, configuration of the door assembly and/or the desired detection precision;

even though the above embodiments of collision detection for doors have been described being mounted to door assemblies which include rectangular door panels, they can be mounted to door assembly having other configuration using any suitable mounting elements or assemblies;

the presence detector may be mounted to a door assembly including only one or a plurality of doors pivotally or slidably mounted to the floor or ceiling or to any other structure using a pivot assembly or a track; such a presence detector does not require a door frame to operate;

the presence detector may include ultrasound transducers configured for operation in a crossing mode which results in a plurality of detecting walls. Such plurality of detecting walls may be parallel, perpendicular or together define any angle;

when a presence detectors according to any one of the above-described embodiments includes one or more transducers driven to operate in the ranging mode, windowing technique can be used to eliminate reflections coming for the resulting wide beam. A time window algorithm can also be implemented in the detector controller for example so as to reduce false alarm rate (FAR). According to this method, the signal analysis performed by the detector controller on the received echoes is limited to one or more predetermined spatial regions where a body is more prone to collide with the door, whereby any surrounded noises will be ignored, even though they can be detected by the detector; and when such presence detector include one or more transducers driven to operate in the ranging mode, an active adaptive threshold algorithm can be implemented, such as the one described in U.S. Pat. No. 7,130,244 B2 issued in Oct. 31, 2006 to Gal et al. and titled "Device and Method for Adaptive Ultrasound Sensing", the entire content of which is herein incorporated by reference. FIGS. 19 and 20 summarize such a method.

The above-described presence detector for door assemblies can be adapted for both automatic and non-automatic doors assemblies.

Even though the above ultrasound door entrance detectors have been described with reference to embodiments including transducers mounted directly to the door, door panels or to the frame of the door, a person skilled in the art will appreciate that the transducers can also be mounted to other structures adjacent the door.

What is claimed is:

1. A presence detector for a door assembly including a door which closes a door entrance and which is characterized by a position relatively to the door entrance, the detector comprising:
a transducer assembly mounted to the door assembly i) that emits a plurality of ultrasound detecting beams adjacent the door entrance yielding a detecting zone adjacent the door entrance, ii) that modifies the detecting zone in accordance with the position of the door and, iii) that triggers a detecting signal indicative of a body located said adjacent the door entrance when the body intersects at least one of the plurality of ultrasound detecting beams;
wherein each of the plurality of ultrasound detecting beams being characterized by a length, wherein the transducer assembly further modifies the detecting zone according to environmental changes adjacent the door entrance so that the length of each of the plurality of ultrasound detecting beams is invariant with the environmental changes.

2. A detector as recited in claim 1, wherein the plurality of ultrasound detecting beams defining a plurality of detecting lines; the presence detector operating in a crossing mode whereby the detecting signal indicative of a body located adjacent the door entrance being triggered when the body crosses one of the detecting lines.

3. A detector as recited in claim 2, wherein the door assembly is a sliding door assembly further including a door frame; the door having two opposite lateral sides and being slidably mounted to the door frame so that one of the lateral sides faces the door entrance.

4. A detector as recited in claim 3, wherein the transducer assembly includes an array of ultrasound transducers mounted to the door frame so as to emit the plurality of detecting beams towards the door entrance.

5. A detector as recited in claim 4, further comprising an array of detecting elements mounted to the door frame opposite the door entrance relative the array of ultrasound transducers for creating the plurality of detecting lines therewith; the detecting elements including at least one of ultrasound transducers and ultrasound reflectors.

6. A detector as recited in claim 5, wherein at least one of the ultrasound transducers creates a plurality of the detecting lines with a plurality of the detecting elements.

7. A detector as recited in claim 3, wherein the transducer assembly includes an array of ultrasound transducers mounted to the door so as to emit the plurality of ultrasound detecting beams towards the door entrance.

8. A detector as recited in claim 7, wherein the door is a first sliding door; the sliding door assembly further including a second sliding door having opposite lateral sides and being slidably mounted to the door frame so that one of its lateral sides faces the door entrance; wherein the transducer assembly further comprising an array of detecting elements mounted to the door frame opposite the door entrance relative the array of ultrasound transducers for creating the plurality of detecting lines therewith; the second array including at least one of ultrasound transducers and ultrasound reflectors.

9. A detector as recited in claim 8, wherein the detecting lines defining a detecting line pattern between the first and second arrays; the detector further comprising a controller coupled to the transducer assembly for receiving information indicative of a position of at least one of the first and second sliding doors; the controller being configured so as to further control the transducer assembly to modify the detecting line pattern according to the position of at least one of the first and second sliding doors.

10. A detector as recited in claim 7, further comprising a controller coupled to the transducer assembly for receiving information indicative of a time of flight of the plurality of ultrasound detecting beams and for further determining the position of the door using said information.

11. A detector as recited in claim 7, wherein the transducer assembly further comprising an array of detecting elements mounted to the door frame opposite the door entrance relative the array of ultrasound transducers for creating the plurality of detecting lines therewith; the array of detecting elements including at least one of ultrasound transducers and ultrasound reflectors.

12. A detector as recited in claim 2, wherein the transducer assembly includes at least one ultrasound transducer that operates in a ranging mode by sensing a reflection from the body, yielding a dual mode of operation resulting from the crossing mode and the ranging mode.

13. A detector as recited in claim 1, wherein the transducer assembly includes at least one ultrasound transducer configured and driven so as to operate in a ranging mode by sensing a reflection from the body.

14. A detector as recited in claim 13, wherein the door assembly is a sliding door assembly further having a door frame; the door having two opposite lateral sides and being slidably mounted to the door frame so that one of its lateral sides faces the door entrance.

15. A detector as recited in claim 14, wherein the transducer assembly includes a first ultrasound transducer mounted to the door frame above the door on one side of the door entrance for emitting a first ultrasound detecting beam towards the first side of the door entrance and a second ultrasound transducer mounted to the door frame above the door on the other side of the door entrance for emitting a second ultrasound detecting beam towards the second side of the door entrance; the detector being coupled to a door activation controller and sending the detecting signal thereto so that the door activation controller forces the opening of the door when the detecting signal is triggered.

16. A detector as recited in claim 14, wherein said at least one ultrasound transducer includes a first array of ultrasound transducers mounted to the door frame so as to create a plurality of first detecting beams towards the door entrance facing the door entrance.

17. A detector as recited in claim 16, further comprising a controller coupled to the first array of ultrasound transducers for receiving information indicative of a position of the sliding door; the controller being configured so as to further control the transducer assembly to adapt a length of the plurality of first detecting beams according to the information indicative of a position of the sliding door.

18. A detector as recited in claim 17, wherein the door is a first sliding door; the sliding door assembly including a second sliding door having opposite lateral sides and being slidably mounted to the door frame so that one of its lateral sides faces the door entrance; wherein the transducer assembly further comprising a second array of ultrasound transducers mounted to the door frame opposite the door entrance relative the first array of ultrasound transducers for creating a plurality of second detecting beams towards the door entrance facing the door entrance.

19. A detector as recited in claim 18, wherein the controller is further coupled to the second array of transducers; the controller being further configured so as to control the transducer assembly to adapt a length of the plurality of the second detecting beams according to the information indicative of a position of the sliding doors.

20. A detector as recited in claim 14, wherein the sliding door assembly is a vertical door assembly.

21. A detector as recited in claim 14, wherein said at least one ultrasound transducer includes a first array of ultrasound transducers mounted to the door so as to create a plurality of first detecting beams towards the door entrance.

22. A detector as recited in claim 13, wherein the door assembly is a pivoting door assembly further having a door frame; the door is a first door having two lateral sides and being pivotally mounted to the door frame via one of its lateral sides; the at least one detecting beam is at least one first detecting beam; the at least one ultrasound transducer includes at least one first ultrasound transducer mounted to the first door and that projects the at least one first detecting beam towards the door entrance.

23. A detector as recited in claim 22, wherein the at least one first ultrasound transducer includes a first linear array of ultrasound transducers mounted to the first door along the one of its lateral sides and a second linear array of transducers mounted to the first door adjacent the first linear array of ultrasound transducers so as to create at least one second detecting beam towards the door entrance perpendicularly from the at least one first detecting beam.

24. A detector as recited in claim 23, wherein the door assembly further includes a second door having two lateral sides and being pivotably mounted to the door frame opposite the first door relative the door entrance via a first one of its two lateral sides.

25. A detector as recited in claim 24, further comprising first and second linear arrays of detecting elements mounted to the second door along a second one of its lateral sides so that the first and second linear arrays are perpendicular from each other; the ultrasound transducers from the first linear array of ultrasound transducers being further configured and driven so as define detecting lines with the detecting elements in a crossing operational mode thereof whereby the body intersecting one of the detecting lines triggers the detecting signal.

26. A detector as recited in claim 22, wherein the door assembly is a power door assembly wherein the door opens automatically on a first side of the door entrance; the at least one ultrasound transducer being mounted on top of the door on a side thereof corresponding to the first side of the door entrance for projecting the at least one first detecting beam towards the door entrance on the first side thereof up to a predetermined distance from a floor under the power door assembly;
whereby, in operation, the door is prevented from opening from the second side thereof when the detecting signal is triggered.

27. A detector as recited in claim 26, wherein the at least one ultrasound transducer includes a plurality of ultrasound transducers.

28. A detector assembly as recited in claim 27, further comprising a controller coupled to the transducer assembly for receiving information indicative of a position of the door; the controller being configured so as to further control the plurality of ultrasound transducers to power off at least one of the plurality of the ultrasound transducers in response to the position of the door.

29. A detector as recited in claim 13, wherein the at least one of ultrasound transducer operates within at least two zones adjacent the door entrance.

30. A detector as recited in claim 1, wherein at least one of a windowing algorithm and an active adaptative threshold algorithm is used on the detecting signal.

31. A detector as recited in claim 1, wherein the door assembly is a sliding door assembly further having a door frame; the door having two opposite lateral sides and being slidably mounted to the door frame so that one of its lateral sides faces the door entrance; the detector further comprising a door position detector coupled to a controller for detecting the position of the door; the door position detector including a first ultrasound detecting element mounted to the door and a second ultrasound detecting element mounted to the door frame so as to be in a line of sight of the first ultrasound detecting element; the first and second ultrasound detecting element together creating a detecting beam having a length which is used by the controller to determine the position of the door.

* * * * *